United States Patent
Henry

(10) Patent No.: US 11,825,129 B2
(45) Date of Patent: Nov. 21, 2023

(54) SEGMENTATION METHOD AND METHOD FOR SIGNALING SEGMENTATION OF A CODING TREE UNIT

(71) Applicant: ORANGE, Issy-les-Moulineaux (FR)

(72) Inventor: Felix Henry, Saint Gregoire (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/142,612

(22) Filed: Jan. 6, 2021

(65) Prior Publication Data
US 2021/0127141 A1 Apr. 29, 2021

Related U.S. Application Data

(63) Continuation of application No. 15/527,548, filed as application No. PCT/FR2015/053196 on Nov. 24, 2015, now Pat. No. 10,924,769.

(30) Foreign Application Priority Data

Nov. 27, 2014 (FR) ...................................... 1461607

(51) Int. Cl.
*H04N 19/96* (2014.01)
(52) U.S. Cl.
CPC ................... *H04N 19/96* (2014.11)
(58) Field of Classification Search
None
See application file for complete search history.

(56) References Cited

U.S. PATENT DOCUMENTS

| | | | |
|---|---|---|---|
| 2010/0086029 A1* | 4/2010 | Chen | H04N 19/61 375/240.12 |
| 2013/0028326 A1* | 1/2013 | Moriya | H04N 19/91 375/240.16 |
| 2013/0034152 A1* | 2/2013 | Song | H04N 19/186 375/240.03 |
| 2015/0195566 A1* | 7/2015 | Hinz | H04N 19/865 375/240.13 |
| 2016/0173881 A1 | 6/2016 | Alshina et al. | |
| 2017/0201773 A1 | 7/2017 | Tokumitsu et al. | |
| 2017/0280144 A1 | 9/2017 | Dvir et al. | |

FOREIGN PATENT DOCUMENTS

EP 2557792 A1 2/2013

OTHER PUBLICATIONS

International Search Report dated Jul. 6, 2016 for corresponding International Application No. PCT/FR2015/053196, filed Nov. 24, 2015.

(Continued)

*Primary Examiner* — Nasim N Nirjhar
(74) *Attorney, Agent, or Firm* — David D. Brush; Westman, Champlin & Koehler, P.A.

(57) ABSTRACT

A method for encoding at least one image, including subdividing the image into a plurality of blocks and subdividing at least one current block into a first portion and a second portion. The first portion has a rectangular or square shape and the second portion complements the first portion in the current block. The second portion has a geometric shape with m sides, wherein m>4. Then the first and second portions are encoded.

9 Claims, 14 Drawing Sheets

(56) References Cited

OTHER PUBLICATIONS

Vo-Nguyen D-K et al., "Smart decoder: A new paradigm for video coding", 2014 IEEE International Conference on Acoustics. Speech and Signal Processing (ICASSP), IEEE, May 4, 2014 (May 4, 2014), pp. 7382-7386, XP032616822.
Choi K et al., "Coding tree pruning based CU early termination", 6. JCT-VC Meeting; 97. MPEG Meeting; Jul. 14, 2011-Jul. 22, 2011; Torino; (Joint Collaborative Team on Video Coding of ISO/IEC JTC1/SC29/ WG11 and ITU-T SG.16 ); URL: HTTP://WFTP3.ITU.INT/AV-ARCH/JCTVC-SITE/ ,, No. JCTVC-F092, Jul. 5, 2011 (Jul. 5, 2011), XP030009115.
Yang Z et al., "Clarification of the semantics of no residual data flag", 10. JCT-VC Meeting; 101 .-Mpeg-Meeting; Jul. 11, 2012-Jul. 20, 2012—Stockholm—(Joint Collaborative Team on Video Coding of ISO/IEC JTC1/SC29/WG11 and ITU-T SG.16 ); URL: http://wftp3.itu.int/av-arch/jctvc-site/ ,, No. JCTVC-J0336, Jul. 3, 2012 (Jul. 3, 2012), XP030112698.
Joshi R et al., "Screen Content Coding Test Model 2 Encoder Description (SCM 2)" 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16 ); Url: http://wftp3.itu.int/av-arch/jctvc-site/ ,, No. JCTVC-R1014, Oct. 17, 2014 (Oct. 17, 2014), XP030116701.
Guo L et al., "Palette Mode for Screen Content Coding" Apr. 9, 2013 (Apr. 9, 2013), 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16 ); URL:http://wftp3.itu.int/av-arch/jctvc-site/ ,, XP030114280.
Written Opinion of the International Searching Authority dated Jul. 6, 2016 for corresponding International Application No. PCT/FR2015/053196, filed Nov. 24, 2015.
French Search Report and Written Opinion dated Nov. 19, 2015 for corresponding French Application No. 1461607, filed Nov. 27, 2014.
English Translation of Written Opinion of the International Searching Authority dated, Jul. 15, 2016 for corresponding International Application PCT/FR2015/053196, filed Nov. 24, 2015.
ISO/IEC/23008-2 ITU-T Recommendation H.265, High Efficiency Video Coding (HEVC), Oct. 2014.
Office Action dated Nov. 8, 2018 for corresponding U.S. Appl. No. 15/527,548, filed May 17, 2017.
Final Office Action dated Apr. 1, 2019 for corresponding U.S. Appl. No. 15/527,548, filed May 17, 2017.
Office Action dated Feb. 25, 2020 for corresponding U.S. Appl. No. 15/527,548, filed May 17, 2017.
Notice of Allowance dated Oct. 19, 2020 for corresponding U.S. Appl. No. 15/527,548, filed May 17, 2017.

\* cited by examiner

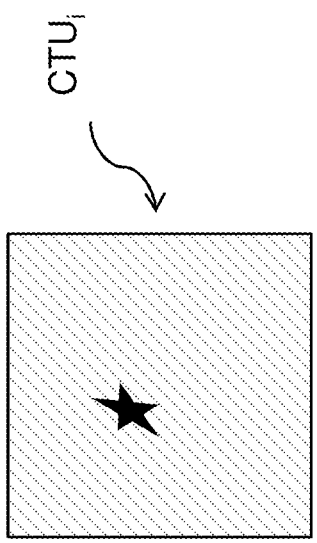
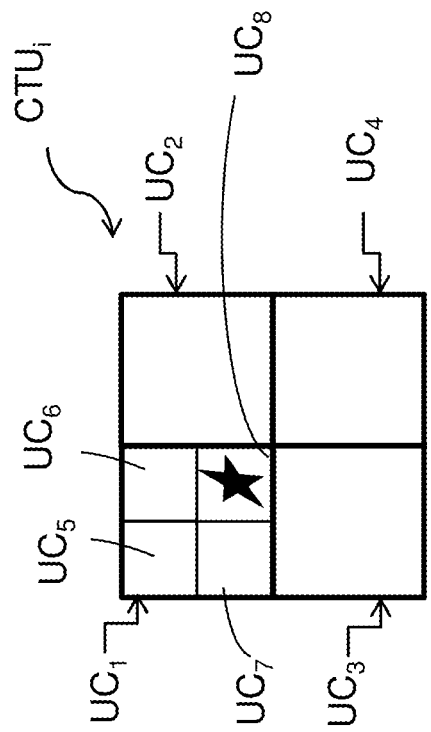
FIG.2A
FIG.2B

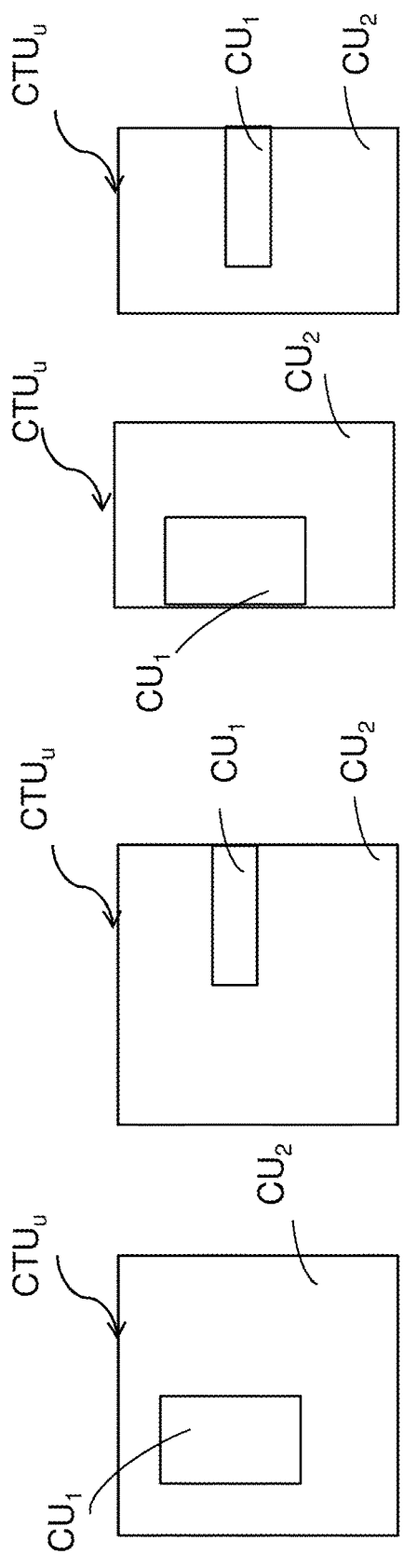
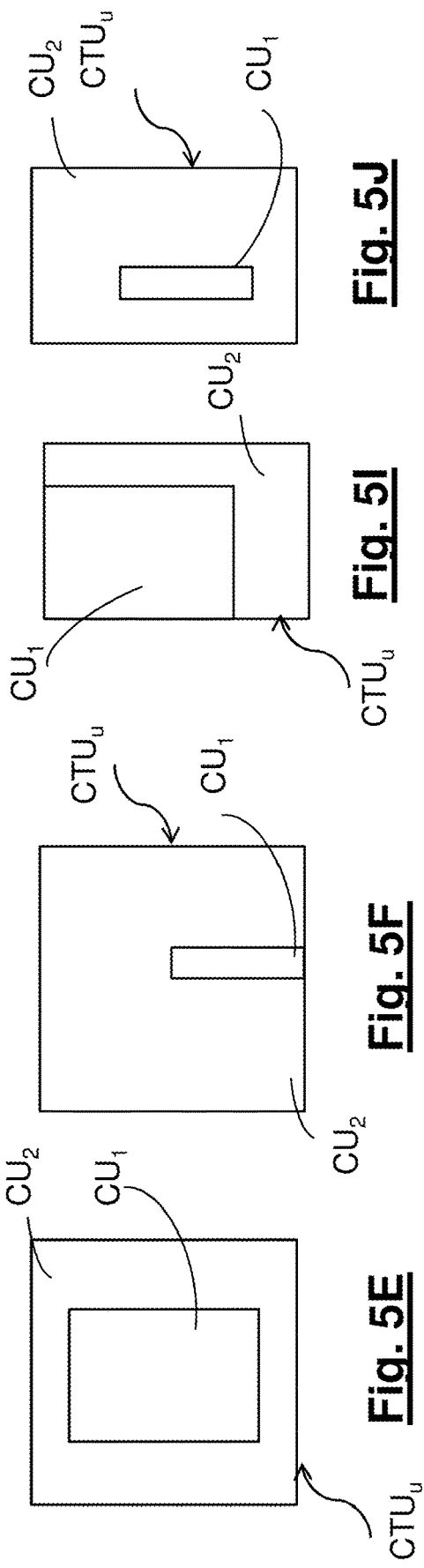

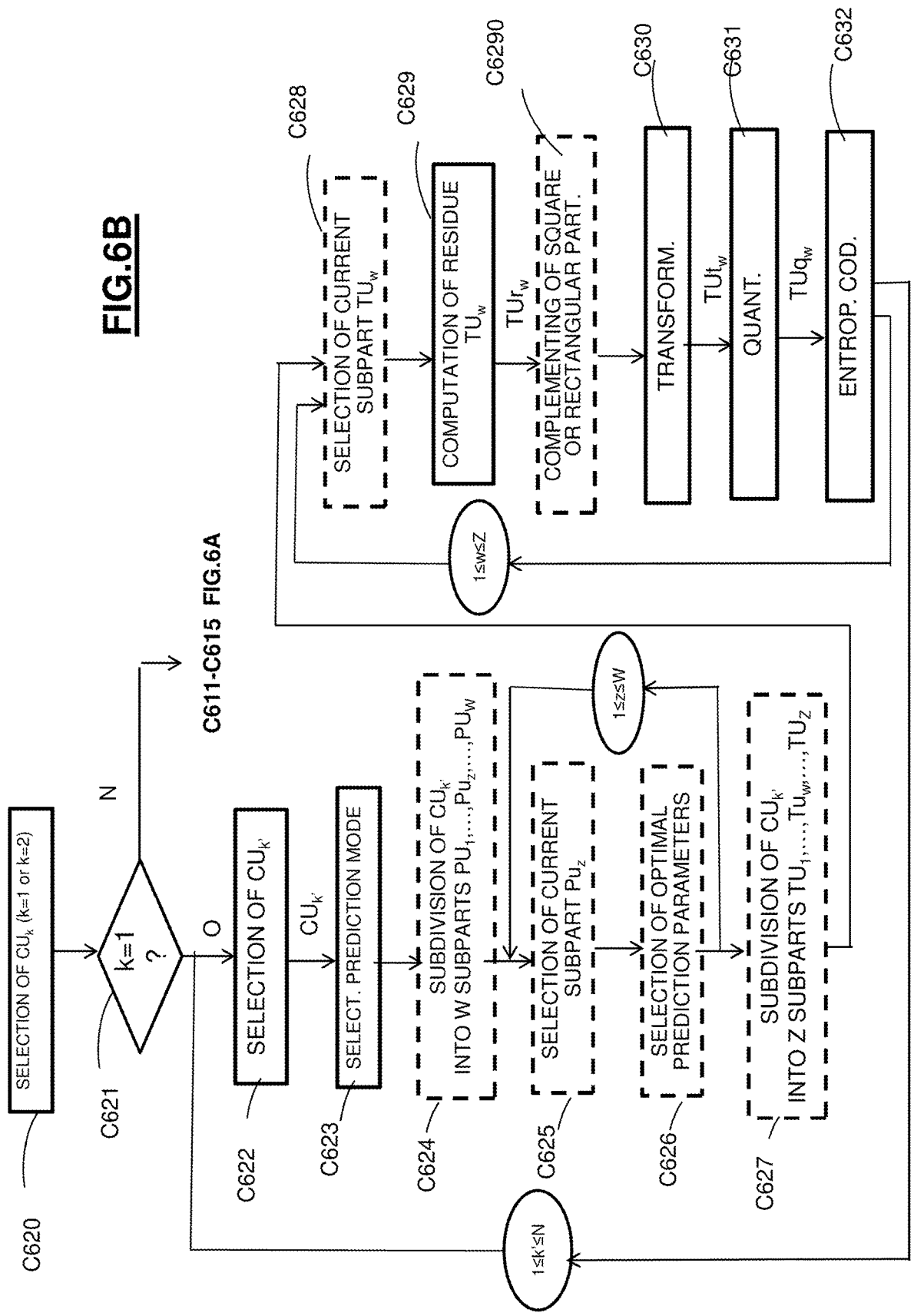

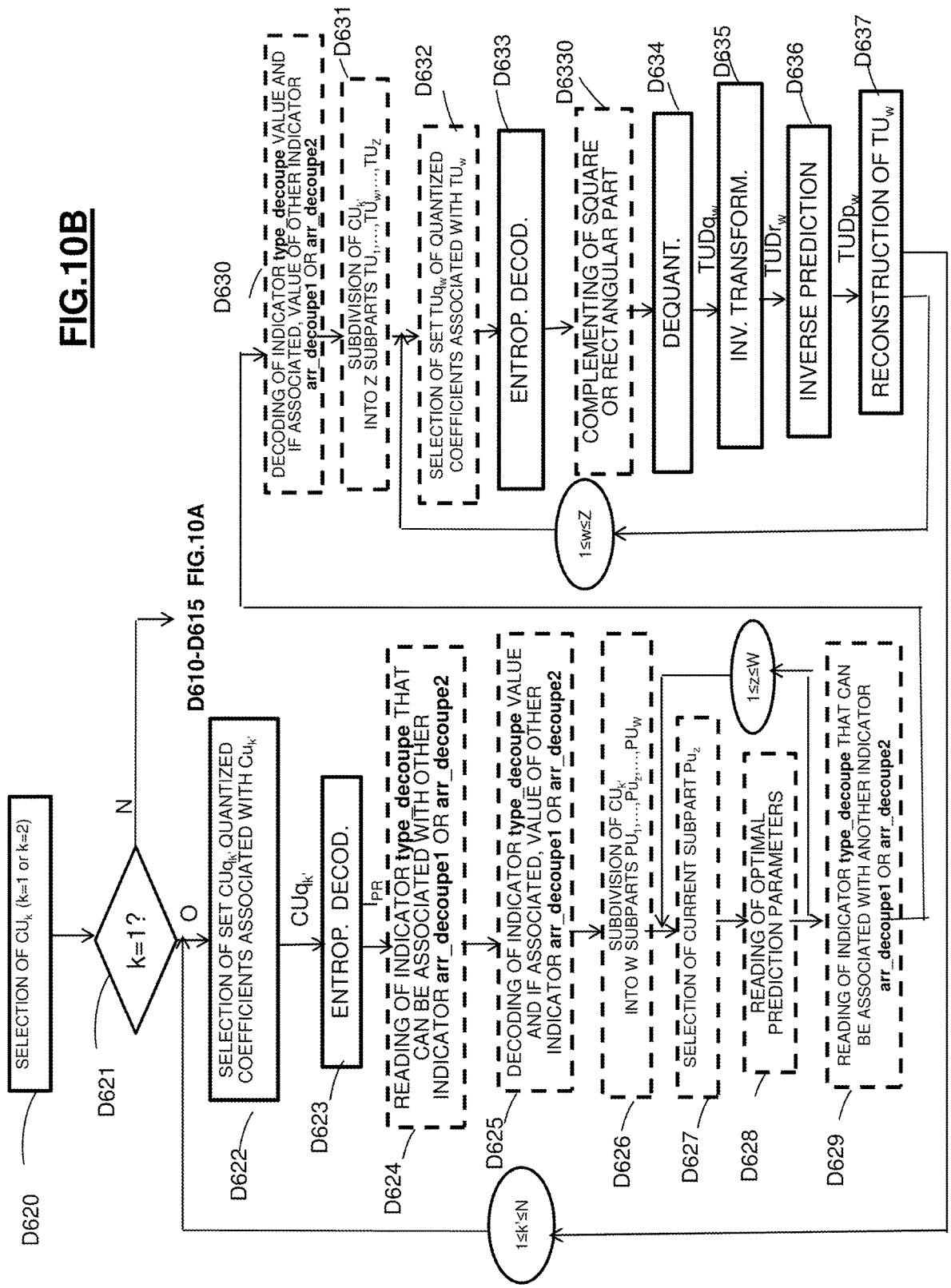

SEGMENTATION METHOD AND METHOD FOR SIGNALING SEGMENTATION OF A CODING TREE UNIT

CROSS-REFERENCE TO RELATED APPLICATIONS

This Application is Continuation of U.S. application Ser. No. 15/527,548, filed May 17, 2017, which is a Section 371 National Stage Application of International Application No. PCT/FR2015/053196, filed Nov. 24, 2015, and published as WO 2016/083729 on Jun. 2, 2016, not in English, the contents of which are incorporated herein by reference in their entireties.

FIELD OF THE INVENTION

The present invention relates generally to the field of image processing, and more particularly to the coding and decoding of digital images and of sequences of digital images.

The invention can be applied particularly, but not exclusively, to the video coding implemented in the current AVC and HEVC video coders, and their extensions (MVC, 3D-AVC, MV-HEVC, 3D-HEVC, etc.), as well as to the corresponding decoding.

BACKGROUND OF THE INVENTION

Current video coders (MPEG, H.264, HEVC, . . . ) use a block representation of the images to be coded. The images are subdivided into blocks of square or rectangular form, which can in turn be subdivided recursively. In the HEVC standard, such a recursive subdivision observes a tree structure called "quadtree". To this end, as represented in FIG. 1, a current image IN is subdivided a first time into a plurality of square or rectangular blocks called CTUs (coding tree units), designated $CTU_1, CTU_2, CTU_i, \ldots, CTU_L$. Such blocks for example have a size of 64×64 pixels ($1 \leq i \leq L$).

For a given block $CTU_i$, it is considered that this block constitutes the root of a coding tree in which:
- a first level of leaves under the root corresponds to a first level of depth of subdivision of the block $CTU_i$ for which the block $CTU_i$ has been subdivided a first time into a plurality of square or rectangular coding blocks called CUs (coding units),
- a second level of leaves under the first level of leaves corresponds to a second level of depth of partitioning of the block $CTU_i$ for which some blocks of said plurality of coding blocks of the block partitioned a first time are partitioned into a plurality of coding blocks of CU type, . . . .
- . . . a kth level of leaves under the k−1th level of leaves which corresponds to a kth level of depth of partitioning of the block $CTU_i$ for which some blocks of said plurality of coding blocks of the block partitioned k−1 times are partitioned one last time into a plurality of coding blocks of CU type.

In an HEVC-compatible coder, the iteration of the partitioning of the block $CTU_i$ is performed to a predetermined level of depth of partitioning.

At the end of the abovementioned successive partitionings of the block $CTU_i$, as represented in FIG. 1, the latter is finally partitioned into a plurality of coding blocks denoted $UC_1, UC_2, \ldots, UC_j, \ldots, UC_M$, where $1 \leq j \leq M$.

The aim of such a subdivision is to delimit zones which adapt well to the local characteristics of the image, such as, for example, a uniform texture, a constant motion, an object in the foreground in the image, etc.

For a block $CTU_i$ considered, several different subdivisions of the latter are placed in competition in the coder, that is to say respectively different combinations of subdivision iterations, in order to select the best subdivision, that is to say the one which optimizes the coding of the block $CTU_i$ considered according to a predetermined coding performance criterion, for example the rate/distortion cost or else an efficiency/complexity compromise, which are criteria well known to those skilled in the art.

Once a block $CTU_i$ considered has been optimally subdivided, a sequence of digital item of informations, such as a series of bits for example, representative of this optimal subdivision, is transmitted in a data signal intended to be stored on the coder or else transmitted to a video decoder to be read, then decoded thereby.

In the example of FIG. 1, the binary sequence representative of the optimal subdivision of the block $CTU_i$ contains the following seventeen bits: 1, 1, 0, 0, 0, 0, 1, 1, 0, 0, 0, 0, 0, 0, 0, 0, 0, for which:
- the first bit "1" indicates a subdivision of the block $CTU_i$ into four smaller subblocks $UC_1, UC_2, UC_3, UC_4$,
- the second bit "1" indicates a subdivision of the subblock $UC_1$ into four smaller subblocks $UC_5, UC_6, UC_7, UC_8$,
- the third bit "0" indicates an absence of subdivision of the subblock $UC_2$,
- the fourth bit "0" indicates an absence of subdivision of the subblock $UC_3$,
- the fifth bit "0" indicates an absence of subdivision of the subblock $UC_4$,
- the sixth bit "0" indicates an absence of subdivision of the subblock $UC_5$,
- the seventh bit "1" indicates a subdivision of the subblock $UC_6$ into four smaller subblocks $UC_9, UC_{10}, UC_{11}, UC_{12}$,
- the eighth bit "1" indicates a subdivision of the subblock $UC_7$ into four smaller subblocks $UC_{13}, UC_{14}, UC_{16}, UC_{16}$,
- the ninth bit "0" indicates an absence of subdivision of the subblock $UC_8$,
- the tenth bit "0" indicates an absence of subdivision of the subblock $UC_9$,
- the eleventh bit "0" indicates an absence of subdivision of the subblock $UC_{10}$,
- the twelfth bit "0" indicates an absence of subdivision of the subblock $UC_{11}$,
- the thirteenth bit "0" indicates an absence of subdivision of the subblock $UC_{12}$,
- the fourteenth bit "0" indicates an absence of subdivision of the subblock $UC_{13}$,
- the fifteenth bit "0" indicates an absence of subdivision of the subblock $UC_{14}$,
- the sixteenth bit "0" indicates an absence of subdivision of the subblock $UC_{15}$,
- the seventeenth bit "0" indicates an absence of subdivision of the subblock $UC_{16}$.

The binary sequence obtained requires an order of scanning of the subblocks to be predetermined in order to know to which subblock a syntax element indicative of the subdivision performed corresponds. As represented by the arrow F in FIG. 1, such an order of scanning is generally lexicographic, that is to say that, for each level of subdivision considered:

the subblocks are scanned beginning with the first subblock $UC_1$ situated top left of the block $CTU_i$ and so on until the subblock $UC_4$ situated bottom right of the block $CTU_i$ is reached.

The subblocks resulting from the subdivision of the subblock $UC_6$ are scanned beginning with the first subblock $UC_9$ situated top left of the subblock $UC_6$ and so on until the subblock $UC_{12}$ situated bottom right of the subblock $UC_6$ is reached, the subblocks resulting from the subdivision of the subblock $UC_7$ are scanned beginning with the first subblock $UC_{13}$ situated top left of the subblock $UC_7$ and so on until the subblock $UC_{16}$ situated bottom right of the subblock $UC_7$ is reached.

The abovementioned seventeen bits are entered one after the other in the binary sequence which is then compressed by a suitable entropic coding.

For at least one subblock considered out of the various subblocks obtained, a prediction of pixels of the subblock considered is implemented relative to prediction pixels which belong either to the same image (intra-prediction), or to one or more preceding images of a sequence of images (inter-prediction) which have already been decoded. Such preceding images are conventionally called reference images and are retained in memory both on the coder and on the decoder. During such a prediction, a residual subblock is computed by subtraction, from the pixels of the subblock considered, of the prediction pixels. The coefficients of the computed residual subblock are then quantized after a possible mathematical transformation, for example of discrete cosine transform (DCT) type, then coded by an entropic coder.

The choice between inter- or intra-prediction mode is made at the level of each of the subblocks $UC_1$, $UC_2$, ..., $UC_j$, ..., $UC_M$ which can themselves be partitioned into prediction subblocks (prediction units) and into transform subblocks (transform units). Each of the prediction subblocks and of the transform subblocks are in turn likely to be recursively subdivided into subblocks according to the abovementioned "quadtree" tree structure.

The block $CTU_i$ and its subblocks $UC_1$, $UC_2$, ..., $UC_j$, ..., $UC_M$, its prediction subblocks and its transform subblocks, are likely to be associated with information describing their content.

Such information is notably as follows:
the prediction mode (intra-prediction, inter-prediction, default prediction producing a prediction for which no information is transmitted to the decoder (skip));
the prediction type (orientation, reference image component, etc.);
the type of subdivision into subblocks;
the transform type, for example DCT 4×4, DCT 8×8, etc. ...;
the pixel values, the transform coefficient values, amplitudes, signs of quantified coefficients of the pixels contained in the block or the subblock considered.

This information is also included in the abovementioned data signal.

During the coding of a fixed image or of an image of a sequence of images using a subdivision into subblocks of quadtree type, it is commonplace to retrieve from the image a significant object of average or small size which is situated in a zone of the image that is relatively uniform. Such a configuration is for example represented in FIG. 2A which represents, as significant element, a star, which is contained in a uniform zone such as, for example, a sky of uniform color.

After implementation of a subdivision into blocks and into subblocks of quadtree type as represented in FIG. 2B, it is possible to isolate the significant element "star" in a subblock $UC_8$ suited to its size.

One drawback with such a subdivision is that it requires the transmission of a binary sequence representative of this subdivision which contains a not-inconsiderable number of bits. Such a sequence proves costly to signal, which does not make it possible to optimize the reduction of the gain in compression of the coded data. This results in unsatisfactory compression performance levels.

SUBJECT AND SUMMARY OF THE INVENTION

One subject of the present invention relates to a method for coding at least one image, comprising a step of subdivision of the image into a plurality of blocks.

The coding method according to the invention is noteworthy in that it comprises the following steps:
subdividing at least one current block into a first part and a second part, the first part having a rectangular or square form and the second part forming the complement of the first part in the current block, the second part having a geometrical form with m sides, with m>4,
coding the first and second parts.

Such an arrangement makes it possible to very simply subdivide a block into only two parts. The binary sequence representative of this subdivision necessarily contains fewer bits than the binary sequence representative of a subdivision of "quadtree" type. The binary sequence representative of the subdivision according to the invention is therefore much less costly to signal.

Moreover, the subdivision according to the invention is particularly well suited to the case where blocks of the image contain a significant element, for example an object in the foreground, which is situated in a uniform zone exhibiting a low energy, such as, for example, a background of uniform color, orientation or motion.

Correlatively, the invention relates to a device for coding at least one image, comprising a partitioning module for subdividing the image into a plurality of blocks.

Such a coding device is noteworthy in that the partitioning module is capable of subdividing at least one current block into a first part and a second part, the first part having a rectangular or square form and the second part forming the complement of the first part in the current block, the second part having a geometrical form with m sides, where m>4, and in that it comprises a coding module for coding the first and second parts.

Correspondingly, the invention relates also to a method for decoding a data signal representative of at least one coded image having been subdivided into a plurality of blocks.

Such a decoding method is noteworthy in that it comprises the following steps:
subdividing at least one current block into a first part and a second part, the first part having a rectangular or square form and the second part forming the complement of the first part in the current block, the second part having a geometrical form with m sides, where m>4,
decoding the first and second parts.

Such an arrangement makes it possible to very simply subdivide a current block to be decoded into only two parts, such a subdivision being much less complex to perform then a subdivision of "quadtree" type.

Moreover, the subdivision according to the invention is particularly well suited to the case where blocks of the image to be decoded contain a significant element, for example an object in the foreground, which is situated in a uniform zone exhibiting a low energy, such as, for example, a background of uniform color, orientation or motion.

In a particular embodiment, during the step of decoding of the second part with m sides of the current block, at least one item of information of reconstruction of the pixels of the second part with m sides of the current block is set to a predetermined value.

One advantage with such an arrangement lies in the fact that the decoder independently determines said at least one item of information of reconstruction of the pixels of the second part with m sides. In other words, said at least one corresponding item of information of reconstruction is advantageously not transmitted in the data signal received on the decoder. Thus, the reduction of the signaling cost is optimized.

According to a variant, said at least one item of information of reconstruction of the pixels of the second part with m sides of the current block is representative of the absence of subdivision of the second part with m sides of the current block.

Advantageously, at the moment of decoding the second part with m sides of the current block, the decoder independently determines that it does not need to subdivide this part, since it characterizes a uniform region of the current block to be decoded which is without detail.

According to another variant, said at least one item of information of reconstruction of the pixels of the second part with m sides of the current block is representative of the absence of residual information resulting from a prediction of the pixels of the second part with m sides of the current block.

Advantageously, at the moment of decoding the second part with m sides of the current block, the decoder independently determines that the residual pixels obtained following the prediction of said second part with m sides have a zero value. It is considered that the second part with m sides is associated with a zero prediction residue since it characterizes a uniform region of the current block to be decoded.

According to yet another variant, said at least one item of information of reconstruction of the pixels of the second part with m sides of the current block is representative of predetermined prediction values of the pixels of the second part with m sides of the current block.

Such a variant makes it possible to even further optimize the signaling cost by avoiding transmitting, in the data signal, the index of the prediction mode which was selected in the coding to predict the second part with m sides of the current block.

In another particular embodiment, the decoding method comprises, prior to the step of subdivision of the current block, a step of reading, in the data signal, an item of information indicating whether the current block is intended either to be subdivided into a first part and a second part, the first part having a rectangular or square form and the second part forming the complement of the first part in the current block, the second part having a a geometrical form with m sides, where m>4, or to be subdivided according to another predetermined method.

Such an arrangement enables the decoder to determine whether, during the coding of a current block, the coder activated or did not activate the subdivision of the current block in accordance with the invention, for a sequence of images considered, for an image considered or even for an image portion (slice) considered, such that the decoder can correspondingly implement the subdivision performed in the coding. The result thereof is that such a decoding method is particularly flexible, because it can be adapted to the current video context. In effect, the decoding method is adapted to implement the subdivision according to the invention or according to another type of subdivision, such as, for example, the quadtree subdivision, according to the value taken by a dedicated indicator included in the data signal.

Such a dedicated indicator is still relatively compact to signal and makes it possible to maintain the compression gain obtained by virtue of the subdivision according to the invention.

In yet another particular embodiment, the decoding method comprises a step of reading, in the data signal, an item of information indicating a subdivision configuration of the current block selected from different predetermined subdivision configurations.

Such an arrangement makes it possible to adapt the subdivision according to the invention according to the location of the significant element in the uniform region of the current block.

In yet another particular embodiment, the step of decoding of the second part with m sides of the current block comprises the substeps consisting in:
  applying an entropic decoding to the pixels of the second part with m sides,
  complementing the entropically decoded pixels of the second part with m sides, with pixels reconstructed according to a predetermined reconstruction method, until a square or rectangular block of pixels is obtained.

Such an arrangement advantageously makes it possible, when a step of application of a transform has to be implemented following the step of entropic decoding of the second part with m sides of the current block to be decoded, to re-use the hardware and software square or rectangular block transform tools which are routinely implemented in the current video coders and decoders.

In yet another particular embodiment, a subdivided current block contains at most a part having a geometrical form with m sides.

Such an arrangement is well suited to the case where the current block contains two zones of quite distinct texture, that is to say the one defined by a single significant element and the one defined by a single uniform zone. Advantageously, it is not therefore necessary to proceed with a new subdivision of the current block to be decoded.

The abovementioned various embodiments or features can be added independently or in combination with one another, to the steps of the decoding method as defined above.

Correlatively, the invention relates to a device for decoding a data signal representative of at least one coded image having been subdivided into a plurality of blocks.

Such a decoding device is noteworthy in that it comprises:
  a partitioning module for subdividing at least one current block into a first part and a second part, the first part having a rectangular or square form and the second part forming the complement of the first part in the current block, the second part having a geometrical form with m sides, where m>4,
  a decoding module for decoding the first and second parts.

The invention also relates to a computer program comprising instructions for implementing one of the coding and decoding methods according to the invention, when it is run on a computer.

Such a program can use any programming language, and be in the form of source code, object code, or intermediate code between source code and object code, such as in a partially compiled form, or in any other desirable form.

Yet another subject of the invention also targets a computer-readable storage medium, and comprising computer program instructions as mentioned above.

The storage medium can be any entity or device capable of storing the program. For example, the medium can comprise a storage means, such as a ROM, for example a CD ROM or a microelectronic circuit ROM, or even a magnetic storage means, for example a USB key or a hard disk.

Also, such a storage medium can be a transmissible medium such as an electrical or optical signal, which can be routed via an electrical or optical cable, wirelessly or by other means. The program according to the invention can in particular be downloaded over a network of Internet type.

Alternatively, such a storage medium can be an integrated circuit in which the program is incorporated, the circuit being adapted to execute the method concerned or to be used in the execution thereof.

BRIEF DESCRIPTION OF THE DRAWINGS

Other features and advantages will become apparent on reading several preferred embodiments described with reference to the figures in which:

FIGS. 2A and 2B represent an application of the subdivision of "quadtree" type to a current block which contains a single significant element, a star, which is contained in a uniform zone such as, for example, a sky of uniform color.

DETAILED DESCRIPTION OF THE CODING PART

An embodiment of the invention will now be described, in which the coding method according to the invention is used to code an image or a sequence of images according to a binary signal similar to that which is obtained by a coding implemented in a coder conforming to any one of the current or future video coding standards.

In this embodiment, the coding method according to the invention is for example implemented by software or hardware by modifications to such a coder. The coding method according to the invention is represented in the form of an algorithm comprising steps C1 to C7 as represented in FIG. 3.

Figure 4:
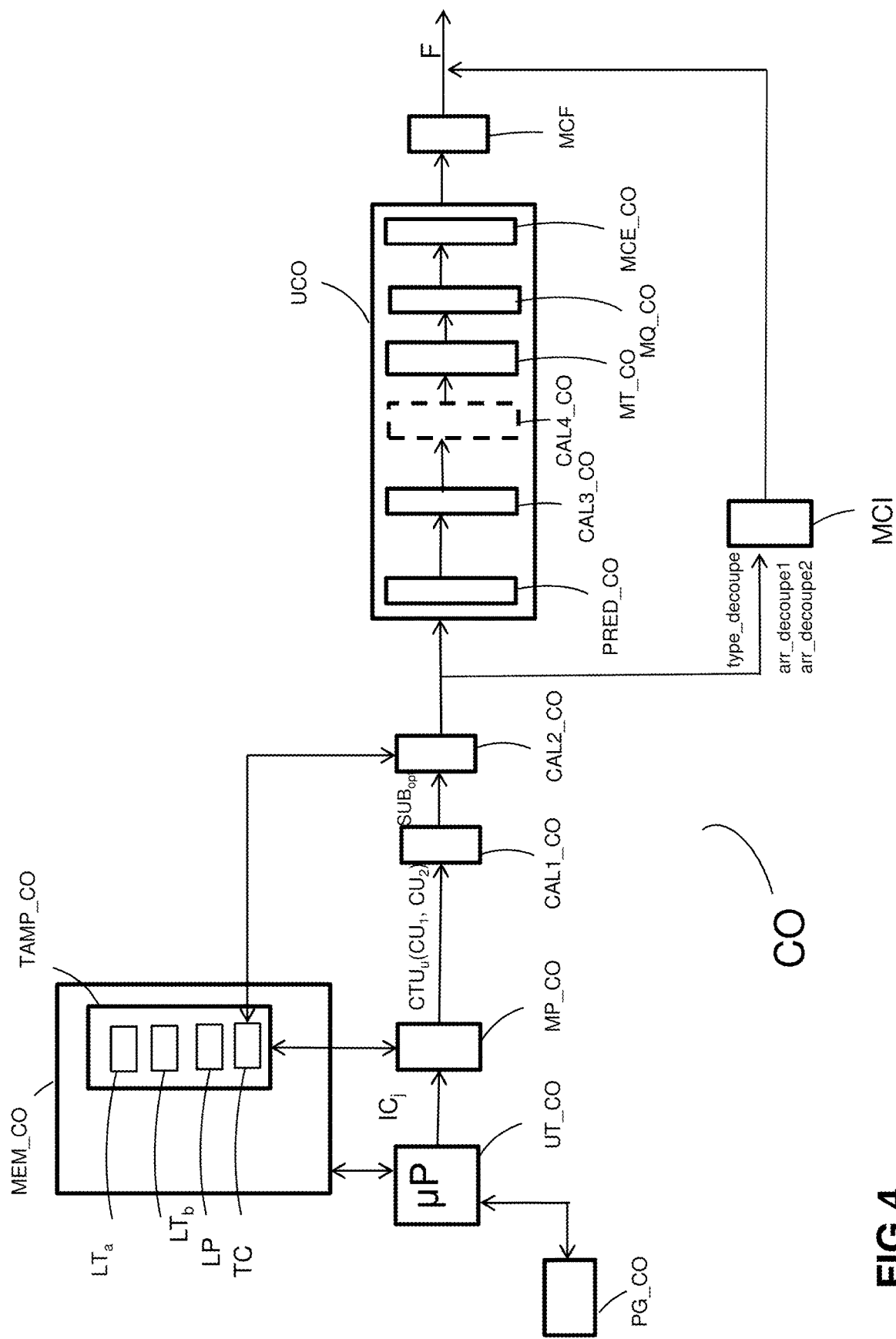
FIG. 4 represents an embodiment of a coding device according to the invention, FIGS. 5A to 5J respectively represent different embodiments of subdivision according to the invention of the current block, FIGS. 6A and 6B respectively represent two embodiments of coding of the parts obtained by subdivision of the current block, in accordance with a type of subdivision represented in FIG. 5A.

According to the embodiment of the invention, the coding method according to the invention is implemented in a coding device or coder CO represented in FIG. 4.

As illustrated in FIG. 4, such a coder comprises a memory MEM_CO comprising a buffer memory TAMP_CO, a processing unit UT_CO equipped for example with a microprocessor µP and driven by a computer program PG_CO which implements the coding method according to the invention. On initialization, the code instructions of the computer program PG_CO are for example loaded into a RAM memory (not represented) before being executed by the processor of the processing unit UT_CO.

Figure 1:
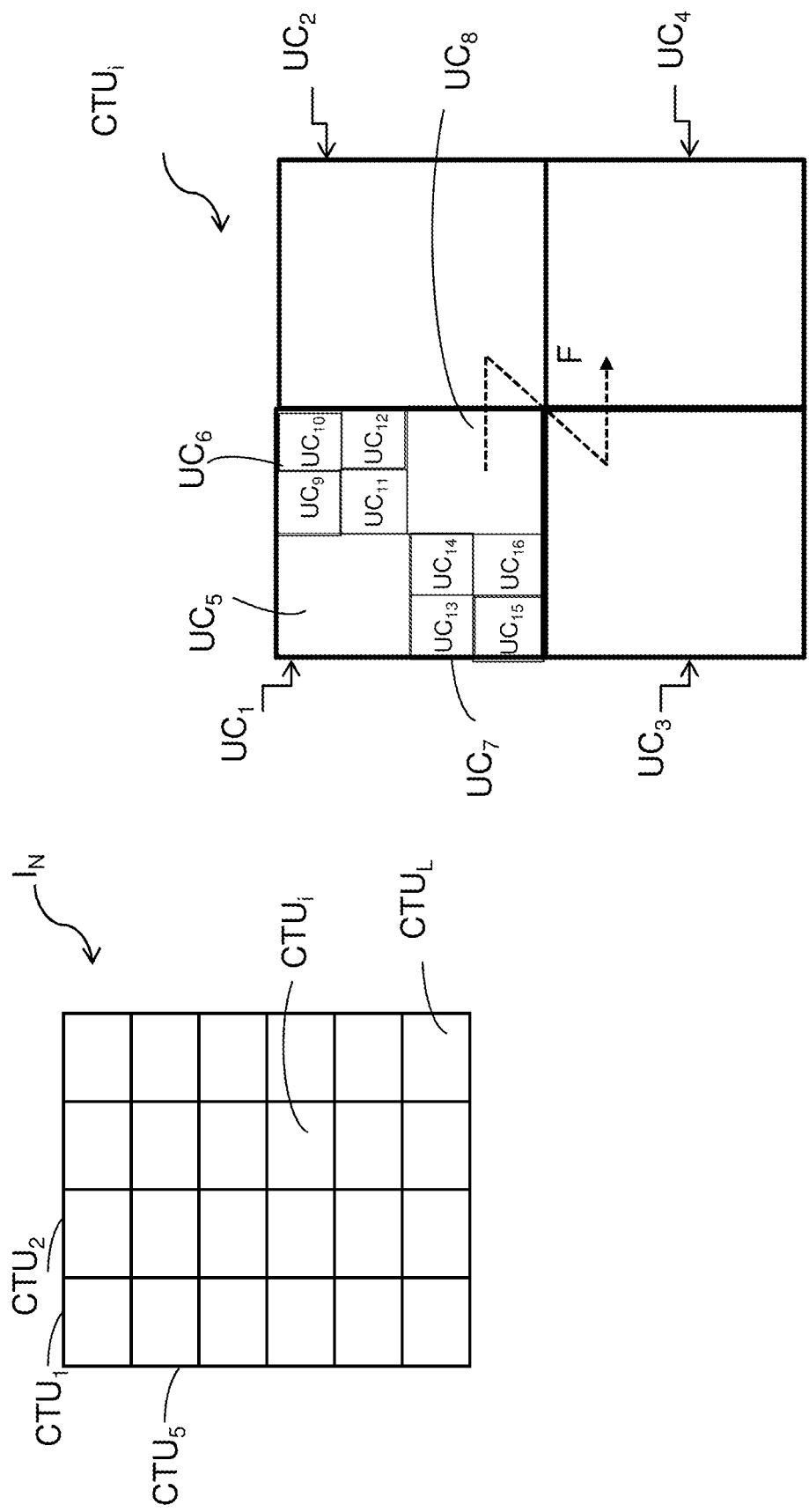
FIG. 1 represents an example of conventional subdivision of a current block, such as the subdivision of "quadtree" type.
Figure 3:
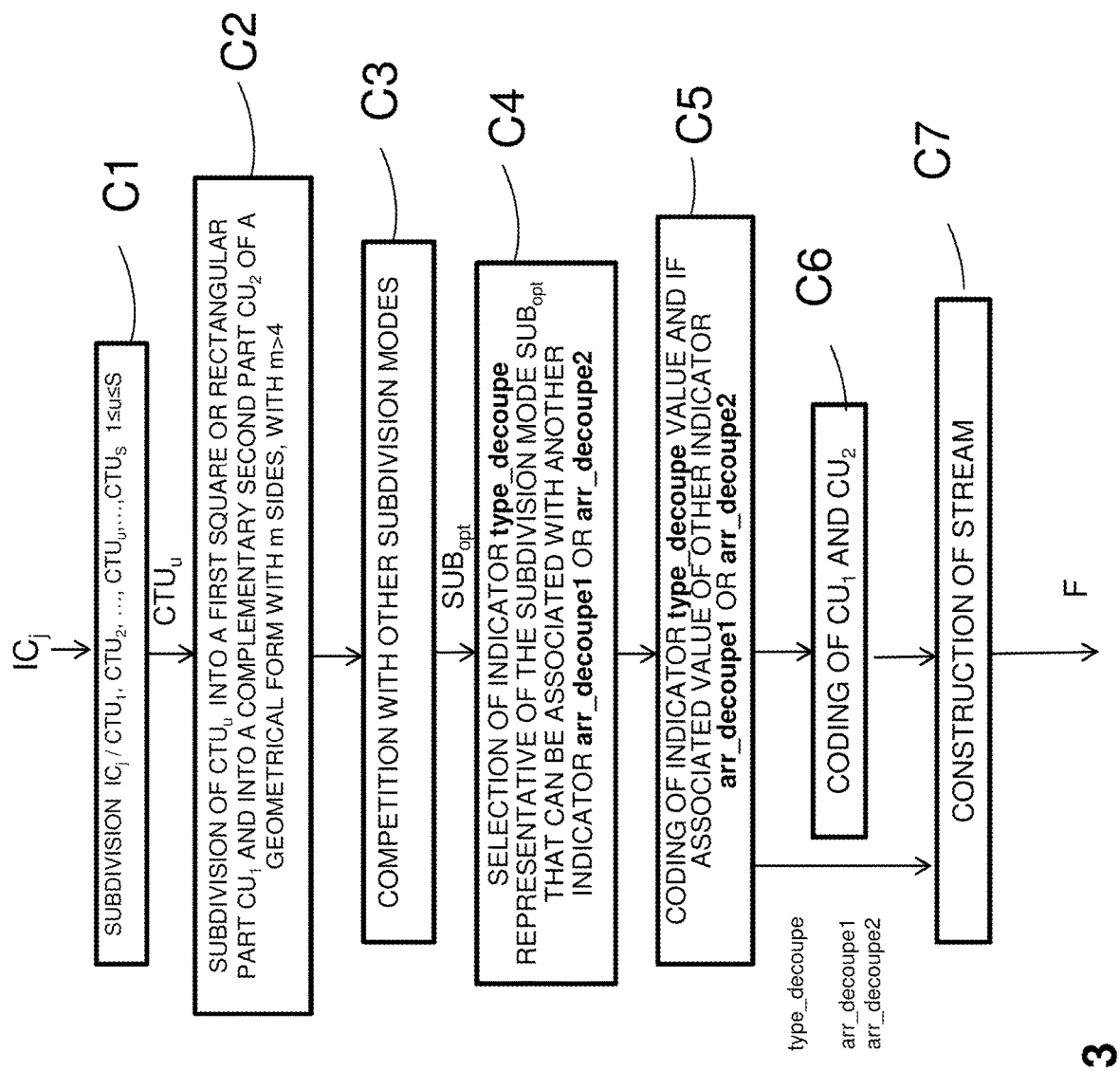
FIG. 3 represents the main steps of the coding method according to an embodiment of the invention.

The coding method represented in FIG. 3 is applied to any current image $IC_j$ fixed or indeed forming part of a sequence of L images $IC_1, \ldots, IC_j, \ldots, IC_L$ ($1 \leq j \leq L$) to be coded.

During a step C1 represented in FIG. 3, as is known per se, a current image $IC_j$ is subdivided into a plurality of blocks of abovementioned CTU type: $CTU_1, CTU_2, \ldots, CTU_u, \ldots, CTU_S$ ($1 \leq u \leq S$).

Such a step of subdivision is implemented by a processor or partitioning software module MP_CO represented in FIG. 4, which module is driven by the microprocessor µP of the processing unit UT_CO.

Preferentially, each of the blocks $CTU_1, CTU_2, \ldots, CTU_u, \ldots, CTU_S$ has a square form and comprises N×N pixels, where N≥2.

According to an alternative, each of the blocks $CTU_1, CTU_2, \ldots, CTU_u, \ldots$, CTUs has a rectangular form and comprises N×P pixels, where N≥1 and P≥2.

During a step C2 represented in FIG. 3, for a previously selected current block $CTU_u$ the partitioning module MP_CO of FIG. 4 subdivides the current block $CTU_u$ into at least one first part and one second part, the first and second parts complementing one another. According to the invention:

the first part has a rectangular or square form, and the second part has a geometrical form with m sides, where m>4.

According to a preferred embodiment, the current block $CTU_u$ is subdivided:

into a first part of rectangular or square form or else into a plurality of parts of rectangular or square form, and into at most one second part of a geometrical form with m sides.

In the sense of the invention, the first and second parts respectively form two distinct coding units $CU_1$ and $CU_2$. The latter terminology is notably used in the HEVC standard "ISO/IEC/23008-2 ITU-T Recommendation H.265, High Efficiency Video Coding (HEVC)".

Figure 5A:
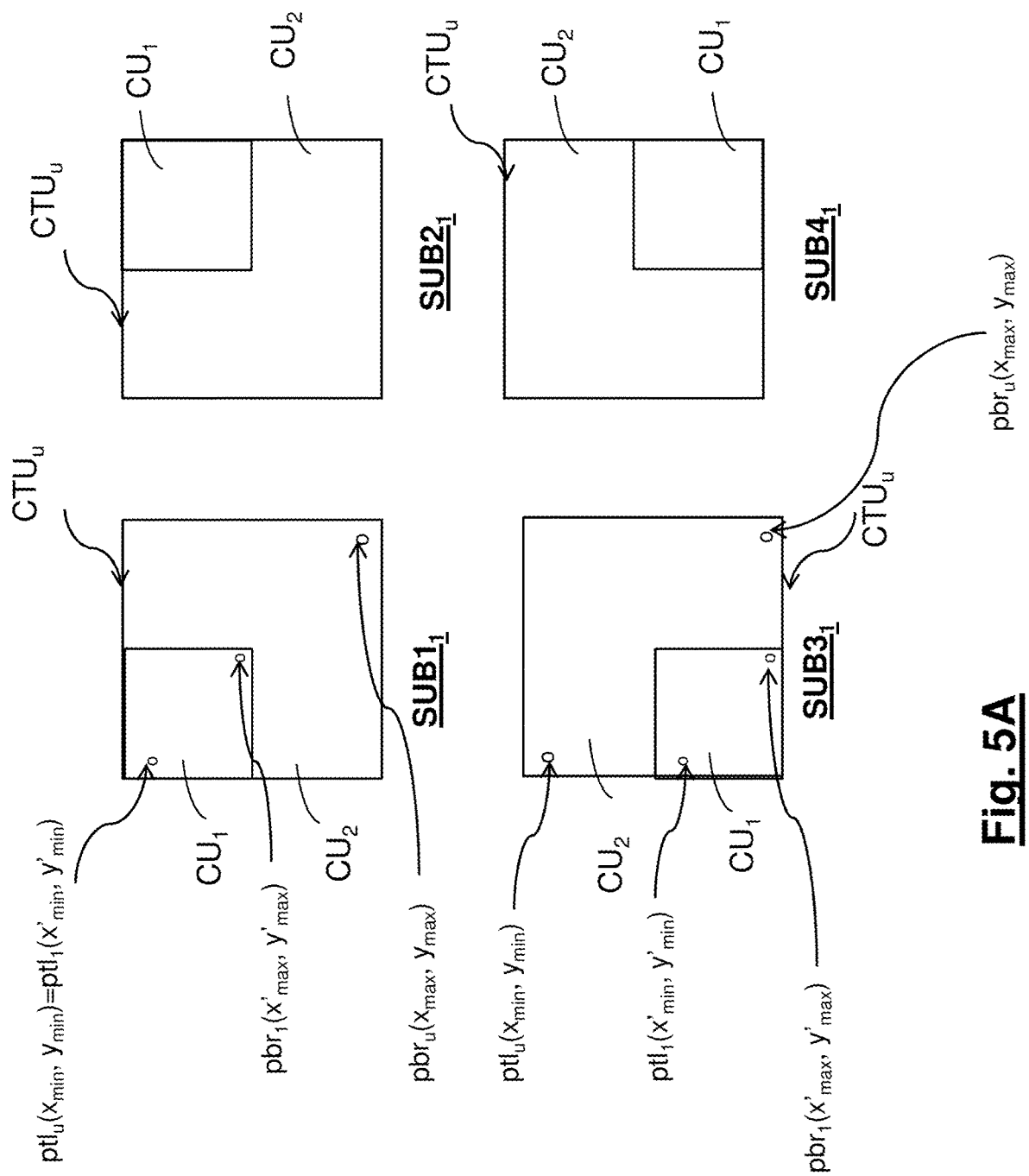

According to a first embodiment of subdivision represented in FIG. 5A, for a square current block $CT_u$ of size N×N:

the first part $CU_1$ is a square block of size N/2×N/2, and the second part $CU_2$, which forms the complement of the first part $CU_1$ in the current block $CTU_u$, has a geometrical form with m sides, where m>4.

In the example represented in FIG. 5A, m=6.

As represented in FIG. 5A, four types of subdivision $SUB1_1, SUB2_1, SUB3_1, SUB4_1$ of the current block $CT_u$ are possible, the square block $CU_1$ being able to be situated in one of the four corners of the current block $CTU_u$.

In the interests of clarity of FIG. 5A, only in the case for example of the types of subdivision $SUB1_1$ and $SUB3_1$, there are represented:

the first pixel $ptl_u$ of the current block $CTU_u$, of coordinates ($x_{min}$, $y_{min}$), which is situated top left therein, the last pixel $pbr_u$ of the current block $CTU_u$, of coordinates ($x_{max}$, $y_{max}$), which is situated bottom right therein, the first pixel $ptl_1$ of the first part $CU_1$, of coordinates ($x'_{min}$, $y'_{min}$), which is situated top left therein, the last pixel $pbr_1$ of the first part $CU_1$, of coordinates ($x'_{max}$, $y'_{max}$), which is situated bottom right therein.

According to the particular type of subdivision $SUB1_1$, the first pixel $ptl_u$ of the current block $CTU_u$ is the same as the first pixel $ptl_1$ of the first part $CU_1$.

Figure 5B:
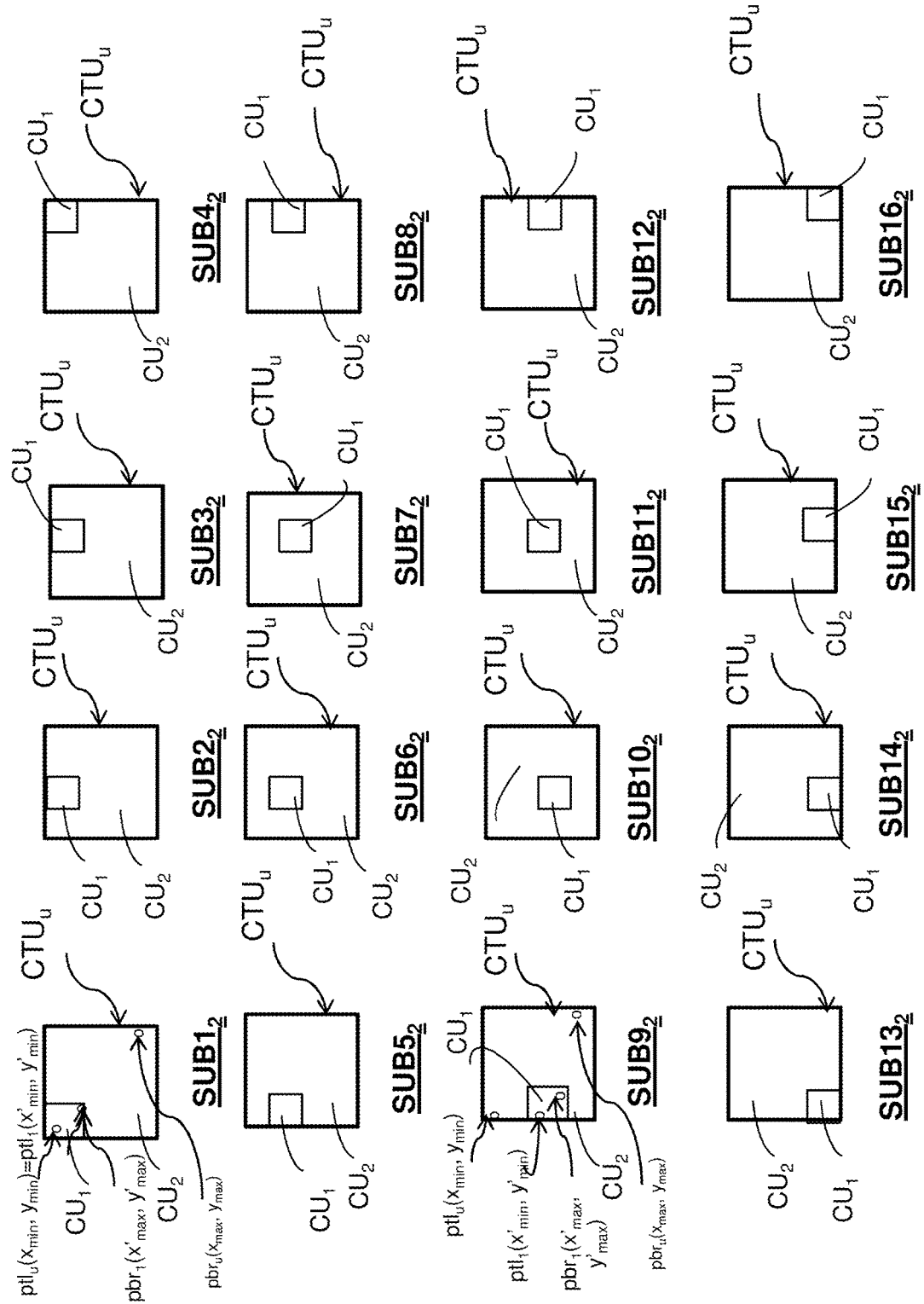

Whatever the type of subdivision chosen, the second part $CU_2$ of a geometrical form with m sides is then defined generally as a set of pixels $ptl_2$ such that, for any pixel $pv_2(x''_v, y''_v)$ of this set:

$x_{min} \leq x''_v \leq x_{max}$ and $y_{min} \leq y''_v \leq y_{max}$ $x''_v < x'_{min}$ or $x''_v > x'_{max}$ or $y''_v < y'_{min}$ or $y''_v > y'_{max}$ According to a second embodiment of subdivision represented in FIG. 5B, for a square current block CTU of size N×N:

the first part $CU_1$ is a square block of size $$\frac{N}{4} \times \frac{N}{4},$$

and the second part $CU_2$, which forms the complement of the first part $CU_1$ in the current block $CTU_u$, has a geometrical form with m sides, where m>4.

In the example represented in FIG. 5B, m=6 or m=8.

As represented in FIG. 5B, sixteen types of subdivision $SUB1_2$, $SUB2_2$, ..., $SUB16_2$ of the current block $CTU_u$ are possible, the square block $CU_1$ being able to be situated in sixteen different positions within the current block $CTU_u$, by successive translation of N/4 pixels of the square block $CU_1$ within the current block $CTU_u$.

In the interests of clarity of FIG. 5B, only in the case, for example, of the types of subdivision $SUB1_2$ and $SUB9_2$, there are represented:

the first pixel $ptl_u$ of the current block $CTU_u$, of coordinates ($x_{min}$, $y_{min}$), which is situated top left therein, the last pixel $pbr_u$ of the current block $CTU_u$, of coordinates ($x_{max}$, $y_{max}$), which is situated bottom right therein, the first pixel $ptl_1$ of the first part $CU_1$, of coordinates ($x'_{min}$, $y'_{min}$), which is situated top left therein, the last pixel $pbr_1$ of the first part $CU_1$, of coordinates ($x'_{max}$, $y'_{max}$), which is situated bottom right therein.

According to the particular mode of subdivision $SUB1_2$, the first pixel $ptl_u$ of the current block $CTU_u$ is the same as the first pixel $ptl_1$ of the first part $CU_1$.

Whatever the type of subdivision chosen, the second part $CU_2$ of a geometrical form with m sides is then defined generally as a set of pixels such that, for any pixel $pv_2(x''_v, y''_v)$ of this set:

$x_{min} \leq x''_v \leq x_{max}$ and $y_{min} \leq y''_v \leq y_{max}$ $x''_v < x'_{min}$ or $x''_v > x'_{max}$ or $y''_v < y'_{min}$ or $y''_v > y'_{max}$ According to third, fourth, fifth and sixth embodiments of subdivision represented respectively in FIGS. 5C, 5D, 5E and 5F, for a square current block CTU of size N×N:

the first part $CU_1$ is a rectangular block of size U×V pixels, such that U<N and V<N, the set of the coordinates of such a rectangular block being chosen from a predefined list $LT_a$ of several sets of coordinates each defining a rectangular block of a predetermined form, the list $LT_a$ being stored in the buffer memory TAMP_CO of the coder CO of FIG. 4, and the second part $CU_2$, which forms the complement of the first part $CU_1$ in the current block $CTU_u$, has a geometrical form with m sides, where m>4.

In each of the FIGS. 5C to 5F, a single type of subdivision of the current block $CTU_u$ has been represented, bearing in mind that there can obviously be several thereof.

Furthermore, the definition of the second part $CU_2$ of the current block CTU is the same as that given in the examples of FIGS. 5A and 5B.

According to seventh, eighth, ninth and tenth embodiments of subdivision represented respectively in FIGS. 5H, 5I, 5J and 5K, the current block $CTU_u$ is a rectangle of size N×P pixels, where N≥1 and P≥2.

According to these four subdivision modes:

the first part $CU_1$ is a rectangular block of size U×V, such that U<N and V<P, the set of the coordinates of such a rectangular block being chosen from a predefined list $LT_b$ of several sets of coordinates each defining a rectangular block of a predetermined form, the list $LT_b$ being stored in the buffer memory TAMP_CO of the coder CO of FIG. 4, and the second part $CU_2$, which forms the complement of the first part $CU_1$ in the current block $CTU_u$, has a geometrical form with m sides, where m>4.

In each of the FIGS. 5G to 5I, a single type of subdivision of the current block CTU has been represented, bearing in mind that there can obviously be several thereof.

Furthermore, the definition of the second part $CU_2$ of the current block CTU is the same as that given in the examples of FIGS. 5A and 5B.

During a step C3 represented in FIG. 3, each of the current blocks $CTU_u$, or only a part, which has been subdivided in accordance with the different subdivision modes according to the invention as represented in FIGS. 5A to 5K is placed in competition:

with different current blocks $CTU_u$ subdivided respectively according to different well known subdivision modes, such as, for example, subdivided into only four rectangular or square blocks, subdivided according to the "quadtree" method, etc., and with a non-subdivided current block $CTU_u$.

Such competition is implemented according to a coding performance criterion predetermined for the current block $CTU_u$, for example the rate/distortion cost or else an efficiency/complexity compromise, which are criteria well known to those skilled in the art.

The competition is implemented by a processor or computation software module CAL1_CO represented in FIG. 4, which module is driven by the microprocessor µP of the processing unit UT_CO.

At the end of the competition, an optimal subdivision mode $SUB_{opt}$ of the current block $CTU_u$ is selected, that is to say that it is the one which optimizes the coding of the block $CTU_u$ by minimization of the rate/distortion cost or else by maximization of the efficiency/complexity compromise.

During a step C4 represented in FIG. 3, an indicator representative of the subdivision mode selected on completion of the step C3 is selected from a look-up table TC stored in the buffer memory TAMP_CO of the coder CO of FIG. 4.

Such a selection is implemented by a processor or computation software module CAL2_CO represented in FIG. 4, which module is driven by the microprocessor µP of the processing unit UT_CO.

The indicator representative of a given subdivision mode is for example a syntax element called type_decoupe which, according to a preferential embodiment, for example takes three values:
- 0 to indicate a conventional subdivision of the current block into four rectangular or square blocks,
- 1 to indicate a subdivision of the current block in accordance with the subdivision mode represented in FIG. 5A,
- 2 to indicate a subdivision of the current block in accordance with the subdivision mode represented in FIG. 5B,
- 3 to indicate an absence of subdivision of the current block.

Moreover, in the case where the syntax element type_decoupe has the value 1, the latter is associated, in the lookup table TC of FIG. 4, with another syntax element called arr_decoupe1 which indicates the type of subdivision $SUB1_1$, $SUB2_1$, $SUB3_1$, $SUB4_1$ chosen, as represented in FIG. 5A. The syntax element arr_decoupe1 takes the value:
- 0 to indicate the subdivision type $SUB1_1$,
- 1 to indicate the subdivision type $SUB2_1$,
- 2 to indicate the subdivision type $SUB3_1$,
- 3 to indicate the subdivision type $SUB4_1$.

Moreover, in the case where the syntax element type_decoupe has the value 2, the latter is associated, in the lookup table TC of FIG. 4, with another syntax element called arr_decoupe2 which indicates the type of subdivision chosen from the sixteen types of subdivision $SUB1_2$, $SUB2_2$, ..., $SUB16_2$ of the current block $CTU_u$, as represented in FIG. 5B. The syntax element arr_decoupe2 takes the value:
- 0 to indicate the subdivision type $SUB1_2$,
- 1 to indicate the subdivision type $SUB2_2$,
- 2 to indicate the subdivision type $SUB3_2$,
- 3 to indicate the subdivision type $SUB4_2$,
- 4 to indicate the subdivision type $SUB5_2$,
- 5 to indicate the subdivision type $SUB6_2$,
- 6 to indicate the subdivision type $SUB7_2$,
- 7 to indicate the subdivision type $SUB8_2$,
- 8 to indicate the subdivision type $SUB9_2$,
- 9 to indicate the subdivision type $SUB10_2$,
- 10 to indicate the subdivision type $SUB11_2$,
- 11 to indicate the subdivision type $SUB12_2$,
- 12 to indicate the subdivision type $SUB13_2$,
- 13 to indicate the subdivision type $SUB14_2$,
- 14 to indicate the subdivision type $SUB15_2$,
- 15 to indicate the subdivision type $SUB16_2$.

During a step C5 represented in FIG. 3, the value of the syntax element type_decoupe which was selected on completion of the abovementioned step C4 is coded, together, if appropriate, with the coding of the syntax element arr_decoupe1 or arr_decoupe2 which is associated with it.

The abovementioned step C5 is implemented by a processor or indicator coding software module MCI such as represented in FIG. 4, which module is driven by the microprocessor µP of the processing unit UT_CO.

During a step C6 represented in FIG. 3, the parts $CU_1$ and $CU_2$ of the current block $CTU_u$ are coded in a predetermined scan order. According to a preferred embodiment, the first part $CU_1$ is coded before the second part $CU_2$. Alternatively, the first part $CU_1$ is coded after the second part $CU_2$.

The coding step C6 is implemented by a processor or coding software module UCO as represented in FIG. 4, which module is driven by the microprocessor µP of the processing unit UT_CO.

As represented in more detail in FIG. 4, the coding module UCO conventionally comprises:
- a prediction processor or software module PRED_CO,
- a residual data computation processor or software module CAL3_CO,
- a transformation processor or software module MT_CO of DCT (discrete cosine transform), DST (discrete sine transform), DWT (discrete wavelet transform) type
- a quantization processor or software module MQ_CO,
- an entropic coding processor or software module MCE_CO, for example of CABAC (context adaptive binary arithmetic coder") type or even a Huffman coder known as such.

During a step C7 represented in FIG. 3, a data signal F is constructed which contains the data coded on completion of the abovementioned steps C5 and C6. The data signal F is then transmitted by a communication network (not represented) to a remote terminal. The latter comprises a decoder which will be described later in the description.

The step C7 is implemented by a data signal construction processor or software module MCF, as represented in FIG. 4.

The coding steps which have just been described above are implemented for all the blocks $CTU_1$, $CTU_2$, ... $CTU_u$, ..., $CTU_S$ to be coded of the current image $IC_j$ considered, in a predetermined order which is, for example, the lexicographic order.

Other types of scanning than that which has just been described above are of course possible.

Figure 6A:
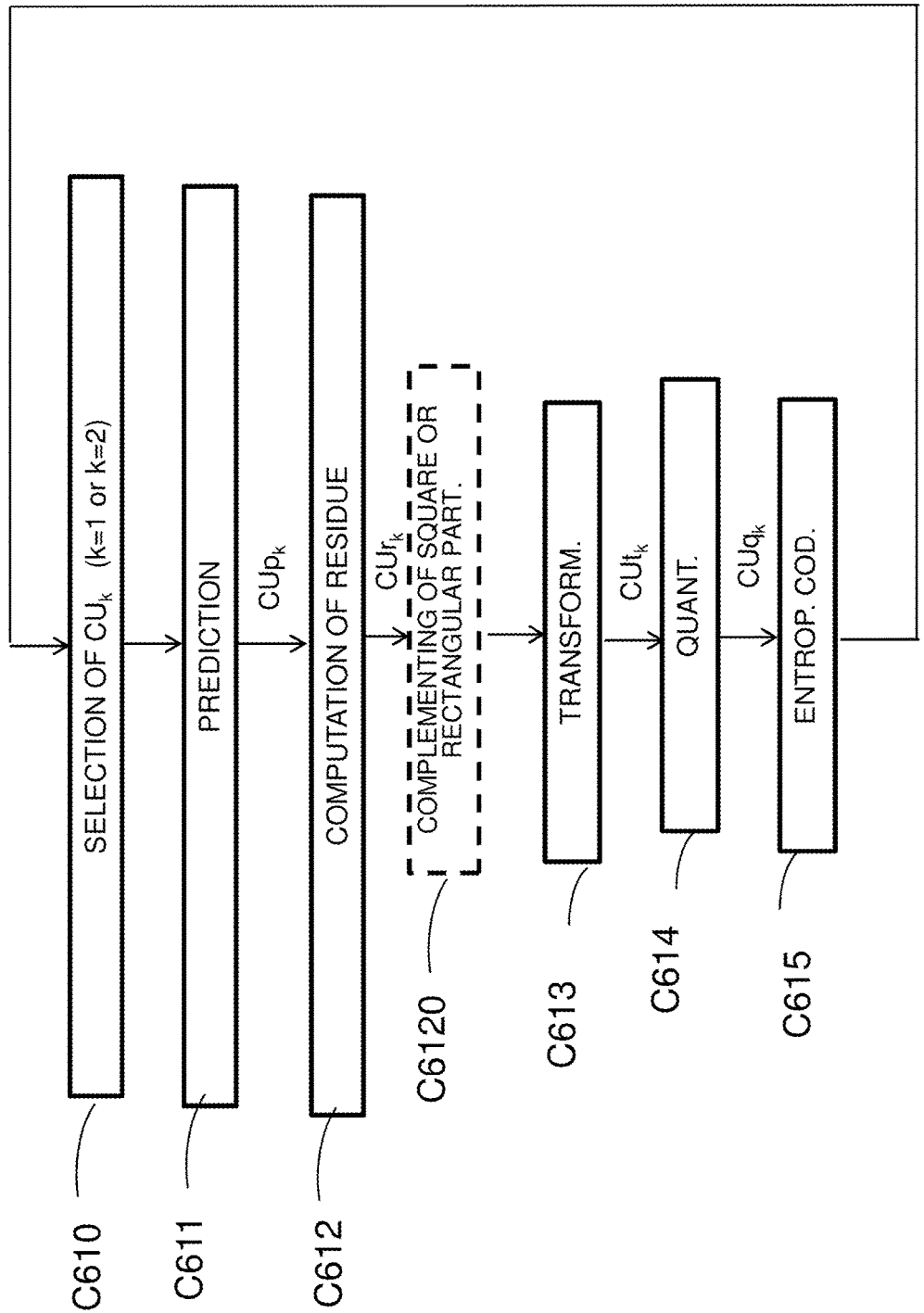

There now follows a description, referring to FIG. 6A, of a first embodiment of the different substeps implemented during the abovementioned coding step C6, in the coding module UCO represented in FIG. 4.

According to this first embodiment, the optimal subdivision mode $SUB_{opt}$ selected on completion of the coding step C3 is for example one of the subdivision modes represented in FIG. 5A. To this end, it is the indicator type_decoupe of value 1 which was selected on completion of the abovementioned step C4. More specifically, it is for example the subdivision type $SUBD2_1$, as represented in FIG. 5A, which was selected on completion of the coding step C3. To this end, the indicator type_decoupe of value 1 is also associated with the indicator arr_decoupe1 of value 1, as defined above in the description.

The value 1 of the indicator type_decoupe is entered in compressed form into the data signal F, followed by the value 1 of the indicator arr_decoupe1.

Moreover, according to the first embodiment of FIG. 6A, the parts $CU_1$ and $CU_2$ of the current block $CTU_u$ are not subdivided again.

To this end, according to one embodiment:
- the indicator type_decoupe of value 3 is associated with the coded data of the first part $CU_1$,
- the indicator type_decoupe of value 3 is associated with the coded data of the second part $CU_2$.

According to the invention, the value of the indicator type_decoupe associated with the coded data of the second part $CU_2$ is entered in compressed form into the data signal F before the value of the indicator type_decoupe associated with the coded data of the first part $CU_1$.

In the example of FIG. 6A, the data signal F therefore contains the following values: 1133 which are representative of the partitioning of the current block $CTU_u$.

As a variant, given the fact that the second part $CU_2$ defines a uniform zone of the current block $CTU_u$, no indicator representative of the absence of subdivision of the part $CU_2$ is entered into the data signal F represented in FIGS. 3 and 4. According to such a variant, it is in fact assumed in the coding, as in the decoding, that an m-sided part of the current block is not systematically subdivided. Thus, the transmission to the decoder of an indicator type_decoupe of value 3 does not prove necessary.

The data signal F therefore contains the following values: 113, which reduces the signaling cost.

During a substep C610 represented in FIG. 6A, the coding module UCO selects, as current part $CU_k$ (k=1 or k=2), either the square part $CU_1$ first, or the m-sided part $CU_2$ first.

During a substep C611 represented in FIG. 6A, the PRED_CO module of FIG. 4 proceeds with the predictive coding of the current part $CU_1$.

Conventionally, the pixels of the part $CU_1$ are predicted relative to the pixels that have already been coded then decoded, by having known intra- and/or inter-prediction techniques compete.

Among the possible predictions for the current part $CU_1$, the optimal prediction is chosen according to a rate-distortion criterion well known to those skilled in the art.

Said abovementioned predictive coding substep makes it possible to construct a predicted part $CUp_1$ which is an approximation of the current part $CU_1$. The information relating to this predictive coding will subsequently be entered into the data signal F represented in FIGS. 3 and 4. Such information notably comprises the prediction type (inter- or intra-prediction), and, if appropriate, the intra-prediction mode or else the reference image index and the motion vector used in the inter-prediction mode. Such information is compressed by the coder CO represented in FIG. 3.

During a substep C612, the computation module CAL3_CO of FIG. 4 proceeds to subtract the predicted part $CUp_1$ from the current part $CU_1$ to produce a residual part $CUr_1$.

During a substep C613 represented in FIG. 6A, the module MT_CO of FIG. 4 proceeds to transform the residual part $CUr_1$ according to a conventional direct transformation operation, such as, for example, a discrete cosine transformation of DCT type, to produce a transform part $CUt_1$.

During a substep C614 represented in FIG. 6A, the module MQ_CO of FIG. 4 proceeds to quantize the transform part $CUt_1$ according to a conventional quantization operation, such as, for example, a scalar quantization. A part $CUq_1$, formed by quantized coefficients, is then obtained.

During a substep C615 represented in FIG. 6A, the module MCE_CO of FIG. 4 proceeds with the entropic coding of the quantized coefficients $CUq_1$.

The abovementioned substeps C611 to C615 are then iterated in order to code the m-sided second part $CU_2$ of the current block $CTU_u$.

According to the invention, in the case of the coding of the m-sided second part $CU_2$, one or more items of information on coding of the pixels of the second part $CU_2$ are set to predetermined values.

Thus, according to a preferred variant embodiment, during the substep C611 of predictive coding of the part $CU_2$ of the current block $CTU_u$, the pixels of the part $CU_2$ are predicted relative, respectively, to pixels of predetermined corresponding values. Such values are stored in a list LP contained in the buffer memory TAMP_CO of the coder CO of FIG. 4.

Preferably, these predetermined prediction values are selected in such a way that, during the substep C612 of FIG. 6A, the subtraction of the predicted part $CUp_2$ from the current part $CU_2$ produces a residual part $CUr_2$ which comprises pixel values that are zero or close to zero.

Such an arrangement makes it possible to advantageously exploit the uniformity of the part $CU_2$ of the current block $CTU_u$ while making it possible to substantially reduce the signaling cost of the coding information of the current block $CTU_u$ in the data signal F.

As a variant, the pixels of the part $CU_2$ are predicted conventionally, in the same way as the part $CU_1$.

According to another preferred variant embodiment, the quantized coefficients of the quantized residual part $CUq_2$ obtained on completion of the substep C614 of FIG. 6A are all set to zero and are not entered into the data signal F.

Such an arrangement makes it possible to advantageously exploit the uniformity of part $CU_2$ of the current block CTU while making it possible to substantially reduce the signaling cost of the coding information of the current block CTU in the data signal F.

According to the invention, between the abovementioned substeps C612 and C613, an intermediate substep C6120 is implemented. During this intermediate substep, the residual pixels of the m-sided residual part $CUr_2$ are complemented with pixels of predetermined respective value, until a square or rectangular block of pixels is obtained.

According to different possible embodiments, the residual pixels of the residual part $CUr_2$ can be complemented:
  with pixels of zero respective value,
  with pixels reconstructed conventionally by interpolation,
  with pixels reconstructed conventionally using the so-called "inpaiting" technique.

The abovementioned substep C6120 is implemented by a computation processor or software module CAL4_CO as represented in FIG. 4, which module is driven by the microprocessor µP of the processing unit UT_CO.

Such an arrangement makes it possible to re-use the transformation module MT_CO of FIG. 4 which conventionally applies square or rectangular block transforms.

Given the fact that the substep C612 is applied only for the second part $CU_2$ of a geometrical form with m sides, this substep, and the computation module CAL4_CO, are represented by dotted lines, respectively in FIGS. 3 and 4.

There now follows a description, referring to FIG. 6B, of a second embodiment of the different substeps implemented during the abovementioned coding step C6, in the coding module UCO represented in FIG. 4.

This second embodiment is distinguished from that of FIG. 6A by the fact that the first part $CU_1$ of the current block $CTU_u$ is subdivided again. An example of such a subdivision of the current block $CTU_u$ is represented in FIG. 7.

Figure 7:
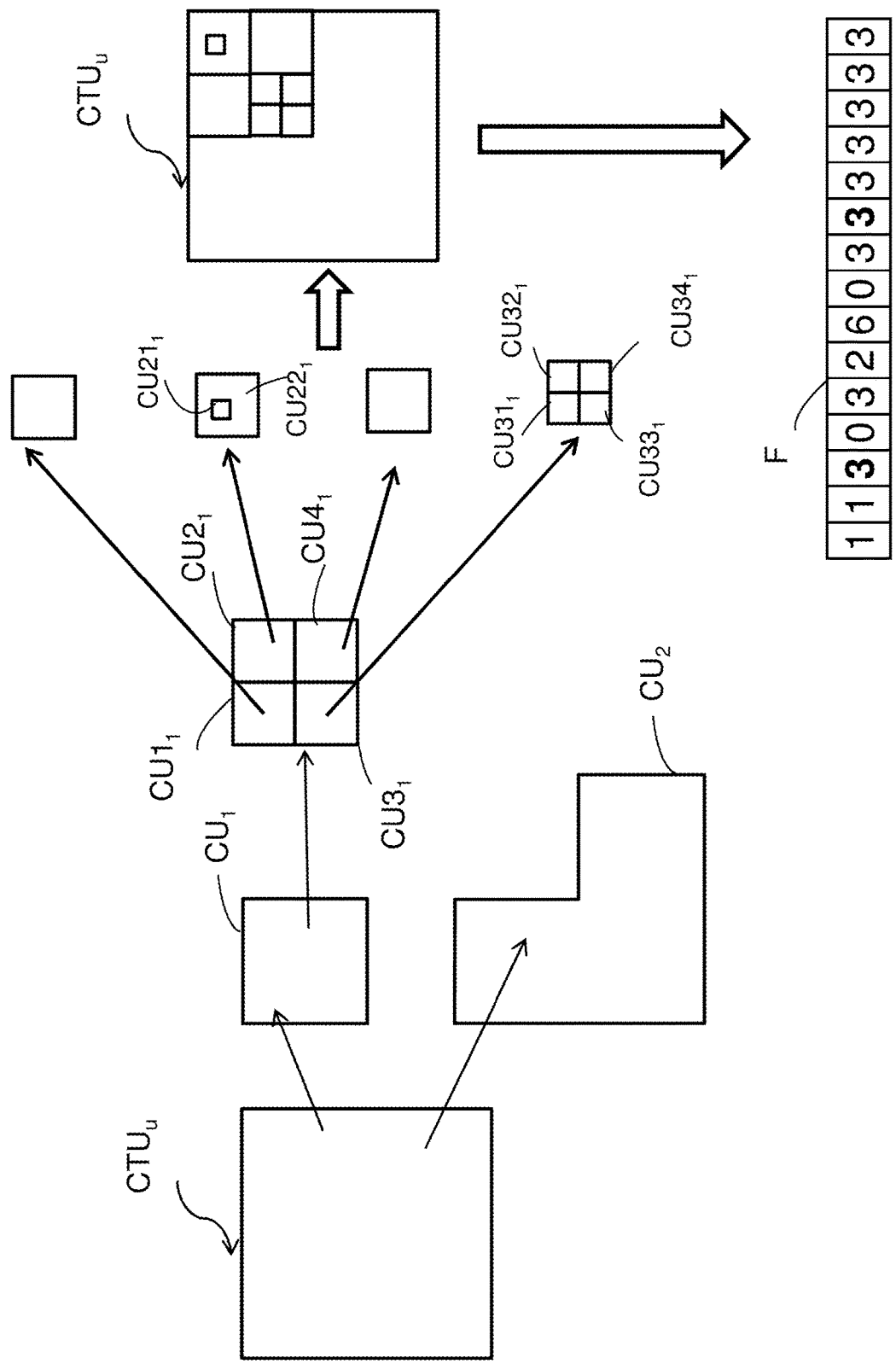
FIG. 7 represents an example of subdivision of the current block to which the coding embodiment of FIG. 6B is applied.

In the example of FIG. 7, the optimal subdivision mode $SUB_{opt}$ which was selected on completion of the abovementioned coding step C3 is, for example, once again the indicator type_decoupe of value 1 which was selected on completion of the abovementioned step C4. As represented in FIG. 7, this value is entered in compressed form into the data signal F. As explained above, the indicator type_decoupe of value 1 is also associated with the indicator arr_decoupe1 of value 1, as defined above in the description. As represented in FIG. 7, the value of the indicator arr_decoupe1 of value 1 is then entered in compressed form into the data signal F following the value of the indicator type_decoupe.

According to the second embodiment of FIG. 6B, in the same way as in the embodiment of FIG. 6A, the second part $CU_2$ of the current block $CTU_u$ is not subdivided again by starting from the principle that it is representative of a uniform zone of the current block $CTU_u$.

Together with the coded data of the second part $CU_2$, the value 3 of the indicator type_decoupe is entered in compressed form into the data signal F, following the value 1 of the indicator arr_decoupe1. This value is represented in bold in FIG. 7.

According to the invention, the value of the indicator type_decoupe associated with the coded data of the second part $CU_2$ is entered in compressed form into the data signal F systematically before the value of the indicator type_decoupe associated with the coded data of the first part $CU_1$.

As a variant, the value of the indicator type_decoupe associated with the coded data of the second part $CU_2$ could be entered in compressed form into the data signal F systematically after the value of the indicator type_decoupe associated with the coded data of the first part $CU_1$.

In the example of FIG. 7, the part $CU_1$ is subdivided, for example into four square blocks $CU1_1$, $CU2_1$, $CU3_1$, $CU4_1$, according to a conventional subdivision method, of "quadtree" type for example.

The coded data of the part $CU_1$ are therefore also associated with the indicator type_decoupe of value 0, representative of such a subdivision, as defined above in the description. As represented in FIG. 7, this value is entered in compressed form into the data signal F, following the value 3 of the indicator type_decoupe.

In the example of FIG. 7, the block $CU1_1$ is not subdivided.

The coded data of the part $CU_1$ are therefore also associated with the indicator type_decoupe of value 3, representative of the absence of such a subdivision, as defined above in the description. As represented in FIG. 7, this value is entered in compressed form into the data signal F, following the value 0 of the indicator type_decoupe.

In the example of FIG. 7, the block $CU2_1$ is subdivided according to the invention, notably according to the type of subdivision $SUB6_2$ represented in FIG. 5B. Thus, the block $CU2_1$ is subdivided into a first part $CU21_1$ of square form and into an m-sided second part $CU22_1$. In the example represented, the second part $CU22_1$ has 8 sides.

The coded data of the part $CU_1$ are therefore also associated with the indicator type_decoupe of value 2, which is itself associated with the indicator arr_decoupe2 of value 6, as defined above in the description. As represented in FIG. 7, these values 2 and 6 are entered successively in compressed form into the data signal F, following the value 3 of the indicator type_decoupe.

In the example of FIG. 7, the block $CU3_1$ is subdivided into four square blocks $CU31_1$, $CU32_1$, $CU33_1$, $CU34_1$, according to a conventional subdivision method, of "quadtree" type for example.

The coded data of the part $CU_1$ are therefore associated also with the indicator type_decoupe of value 0, representative of such a subdivision, as defined above in the description. As represented in FIG. 7, this value is entered in compressed form into the data signal F, following the value 6 of the indicator arr_decoupe2.

In the example of FIG. 7, the block $CU4_1$ is not subdivided.

The coded data of the part $CU_1$ are therefore associated also with the indicator type_decoupe of value 3, representative of the absence of such a subdivision, as defined above in the description. As represented in FIG. 7, this value is entered in compressed form into the data signal F, following the value 0 of the indicator type_decoupe.

The second part $CU22_1$ of the block $CU2_1$ is not subdivided again, starting from the principle that it is representative of a uniform zone of this block.

Together with the coded data of the first part $CU_1$, the value 3 of the indicator type_decoupe is then entered in compressed form into the data signal F, following the value 3 of the indicator type_decoupe. This value is represented in bold in FIG. 7.

According to the invention, the value of the indicator type_decoupe associated with the m-sided part $CU22_1$ of the block $CU2_1$ is entered in compressed form into the data signal F systematically before the value of the indicator type_decoupe associated with the square part $CU21_1$ of the block $CU2_1$.

As a variant, the value of the indicator type_decoupe associated with the m-sided part $CU22_1$ of the block $CU2_1$ could be entered in compressed form into the data signal F systematically after the value of the indicator type_decoupe associated with the square part $C21_1$ of the block $CU2_1$.

In the example of FIG. 7, the first part $CU21_1$ of the block $CU2_1$ is not subdivided. Together with the coded data of the first part $CU_1$, the value 3 of the indicator type_decoupe is then entered in compressed form into the data signal F, following the value 3 of the indicator type_decoupe associated with the m-sided part $CU22_1$ of the block $CU2_1$.

In the example of FIG. 7, the four blocks $CU31_1$, $CU32_1$, $CU33_1$, $CU34_1$ of the block $CU3_1$ are not subdivided. The value 3 of the indicator type_decoupe is then entered in compressed form successively four times into the data signal F, following the value 3 of the indicator type_decoupe associated with the part $CU21_1$ of the block $CU2_1$.

As a variant to this second embodiment, the two values 3 of the indicator type_decoupe as represented in bold in FIG. 7 and representative of the absence of subdivision of the m-sided parts $CU_2$ and $CU22_1$ of the current block CTU are not entered into the data signal F, which makes it possible to reduce the signaling cost. It is in fact assumed, in the coding as in the decoding, that an m-sided part of the current block is not systematically subdivided. Thus, the transmission to the decoder of an indicator type_decoupe of value 3 does not prove necessary.

Reference is once again made to FIG. 6B.

During a substep C620 represented in FIG. 6B, the coding module UCO selects, as current part $CU_k$ (k=1 or k=2), either the square part $CU_1$ first, or the m-sided part $CU_2$ first.

During a substep C621 represented in FIG. 6B, the coding module UCO tests whether the index k associated with the current part $CU_k$ has the value 1 or 2.

If the index k is equal to 2, the part $CU_2$ of the current block CTU is coded according to the substeps C611 to C615 of FIG. 6A.

If the index k is equal to 1, during a substep C622 represented in FIG. 6B, the coding module UCO of FIG. 4 selects a current subpart $CU_{k'}$ of the first part $CU_1$ of the current block $CTU_u$, such that 1≤k'≤N.

In the example represented in FIG. 7, N=8, since the first part $CU_1$ of the current block CTU has been subdivided into eight subparts of "coding unit" type $CU1_1$, $CU21_1$, $CU22_1$, $CU31_1$, $CU32_1$, $CU33_1$, $CU34_1$, $CU4_1$.

During a substep C623 represented in FIG. 6B, the PRED_CO module of FIG. 4 selects, for this current subpart $CU_{k'}$ an inter- or intra-prediction mode, for example by having these modes compete according to a rate-distortion criterion. The prediction mode selected is associated with an indicator IPR which is intended to be transmitted in the data signal F.

During an optional substep C624 represented in FIG. 6B, the partitioning module MP_CO of FIG. 4 subdivides the current subpart $CU_{k'}$ into a plurality W of prediction subparts $PU_1, PU_2, \ldots, PU_z, \ldots PU_W$ ($1 \leq z \leq W$) of the abovementioned "prediction unit" type. Such a subdivision can be conventional or else in accordance with the invention, as represented in FIGS. 5A and 5B. In a way similar to what was described with reference to the embodiment of FIG. 6A, a succession of indicators representative of the subdivision is intended to be transmitted in the data signal F.

During an optional substep C625 represented in FIG. 6B, the coding module UCO of FIG. 4 selects a first current subpart $PU_z$. Such a selection is made in a predefined order, such as, for example, lexicographic order.

During an optional substep C626 represented in FIG. 6B, the PRED_CO module of FIG. 4 selects, for the current subpart $PU_z$ the optimal prediction parameters associated with the prediction mode selected in the abovementioned substep C623. If, for example, the inter-prediction mode was selected in the abovementioned substep C623, the optimal prediction parameters are one or more motion vectors, as well as one or more reference images, such optimal parameters making it possible to obtain the best performance levels in coding of the current subpart $PU_z$ according to a predetermined criterion, such as, for example, the rate-distortion criterion. If, for example, the intra-prediction mode was selected in the abovementioned substep C623, the optimal prediction parameters are associated with an intra mode selected from different available intra modes. As for the inter mode, the optimal prediction parameters are those which make it possible to obtain the best performance levels in coding of the current subpart $PU_z$ according to a predetermined criterion, such as, for example, the rate-distortion criterion.

The substeps C625 to C626 are iterated for each of the subparts $PU_1, PU_2, PU_z, \ldots, PU_W$ of the current subpart $CU_{k'}$ of the first part $CU_1$ of the current block $CTU_u$, in the predetermined lexicographic order.

During an optional substep C627 represented in FIG. 6B, the partitioning module MP_CO of FIG. 4 subdivides the current subpart $CU_{k'}$ into a plurality Z of transform subparts $TU_1, TU_2, \ldots, TU_w, \ldots TU_Z$ ($1 \leq w \leq Z$) of the abovementioned "transform unit" type. Such a subdivision can be conventional or else in accordance with the invention, as represented in FIGS. 5A and 5B. In a way similar to what was described with reference to the embodiment of FIG. 6A, a succession of indicators representative of the subdivision is intended to be transmitted in the data signal F.

During an optional substep C628 represented in FIG. 6B, the coding module UCO of FIG. 4 selects a first current transform subpart $TU_w$. Such a selection is performed in a predefined order, such as, for example, lexicographic order.

During a substep C629 represented in FIG. 6B, the computation module CAL3_CO of FIG. 4 proceeds, in a way similar to the substep C612 of FIG. 6A, with the computation of a residual subpart $TUr_w$.

During a substep C630 represented in FIG. 6B, the MT_CO module of FIG. 4 proceeds with the transformation of the residual subpart $TUr_w$ according to a conventional direct transformation operation, such as, for example, a discrete cosine transformation of DCT type, to produce a transform subpart $TUt_w$.

During a substep C631 represented in FIG. 6B, the MQ_CO module of FIG. 4 proceeds with the quantization of the transform subpart $TUt_w$ according to a conventional quantization operation, such as, for example, a scalar quantization. A subpart $TUq_w$, formed by quantized coefficients, is then obtained.

During a substep C632 represented in FIG. 6B, the MCE_CO module of FIG. 4 proceeds with the entropic coding of the quantized coefficients $TUq_w$.

The set of substeps C628 to C632 is iterated for each of the subparts $TU_1, TU_2, \ldots, TU_w, \ldots, TU_Z$ of the current subpart $CU_{k'}$ of the first part $CU_1$ of the current block $CTU_u$, in the predetermined lexicographic order.

According to the invention, in the case where the current transform subpart $TU_w$ has a geometrical form with m sides, an intermediate substep C6290 is implemented between the abovementioned substeps C629 and C630. During this intermediate substep, the residual pixels of the residue sub-part $TUr_w$ with m sides are complemented with pixels of zero value or coded according to a predetermined coding method, until a square or rectangular block of pixels is obtained.

The abovementioned substep C6290 is implemented by the computation software module CAL4_CO as represented in FIG. 4.

If the computation substep C6290 is implemented during the substep C631 represented in FIG. 6B, the MQ_CO module of FIG. 4 proceeds with the quantization of the current transform subpart $TUt_w$ to the exclusion of the pixels added during the substep C6290 and which have undergone a transformation during the substep C630.

The set of substeps C622 to C632 is iterated for each of the subparts $CU_1, CU_2, \ldots CU_k, \ldots, CU_N$ of the current first part $CU_1$ of the current block $CTU_u$, in the predetermined lexicographic order.

Detailed Description of the Decoding Part

An embodiment of the invention will now be described, in which the decoding method according to the invention is used to decode a data signal representative of an image or of a sequence of images which is capable of being decoded by a decoder conforming to any one of the current or future video decoding standards.

In this embodiment, the decoding method according to the invention is for example implemented by software or hardware by modifications of such a decoder. The decoding method according to the invention is represented in the form of an algorithm comprising steps D1 to D7 as represented in FIG. 8.

Figure 9:
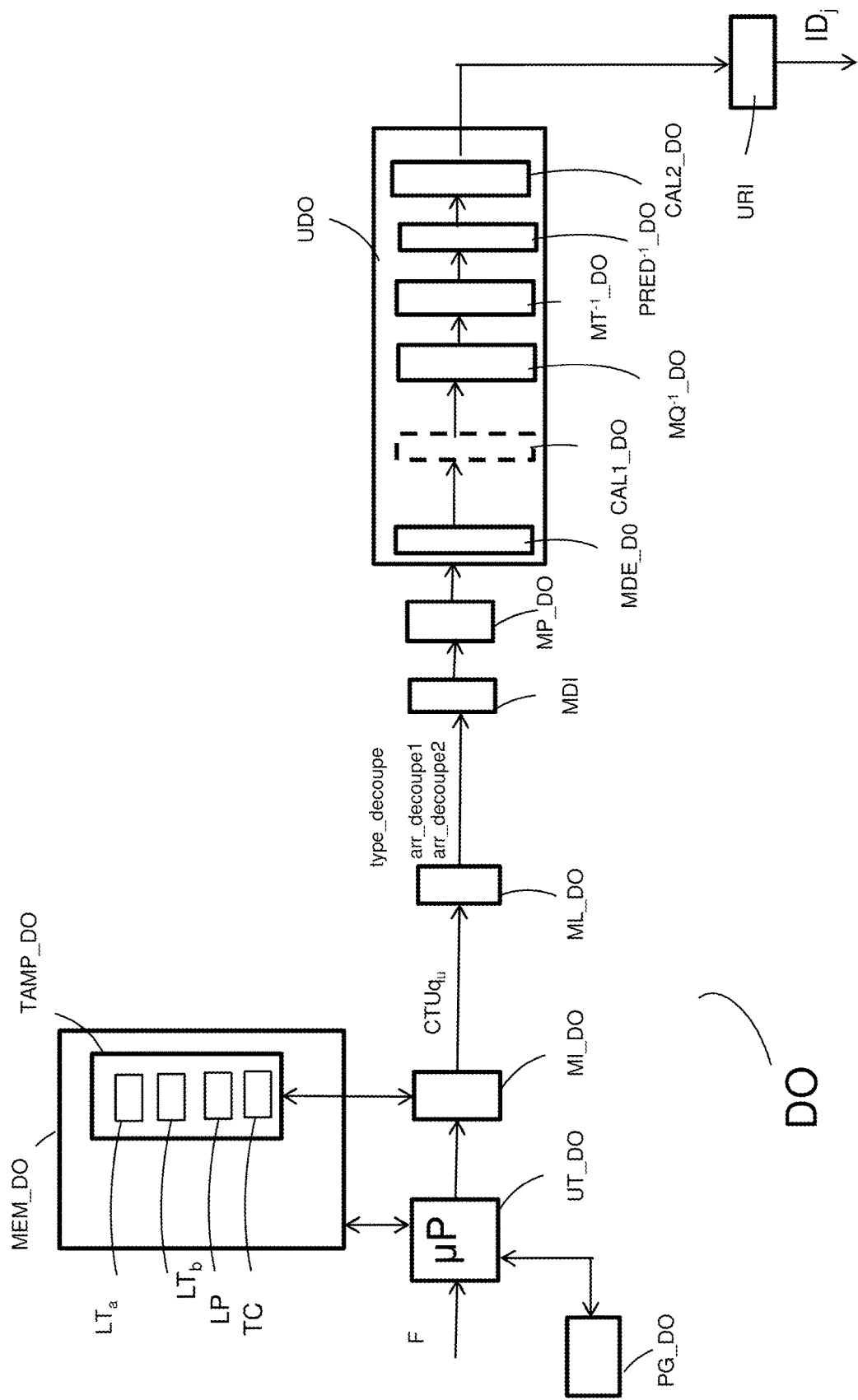
FIG. 9 represents an embodiment of a decoding device according to the invention, FIGS. 10A and 10B respectively represent two embodiments of decoding of the parts obtained after reconstruction of the subdivision of the current block, in accordance with a type of subdivision represented in FIG. 5A.

According to the embodiment of the invention, the decoding method according to the invention is implemented in a decoding device or decoder DO represented in FIG. 9.

As illustrated in FIG. 9, according to this embodiment of the invention, the decoder DO comprises a memory MEM_DO which itself comprises a buffer memory TAMP_DO, a processing unit UT_DO equipped for example with a microprocessor µP and driven by a computer program PG_DO which implements the decoding method according to the invention. On initialization, the code instructions of the computer program PG_DO are for example loaded into a RAM memory before being executed by the processor of the processing unit UT_DO.

Figure 8:
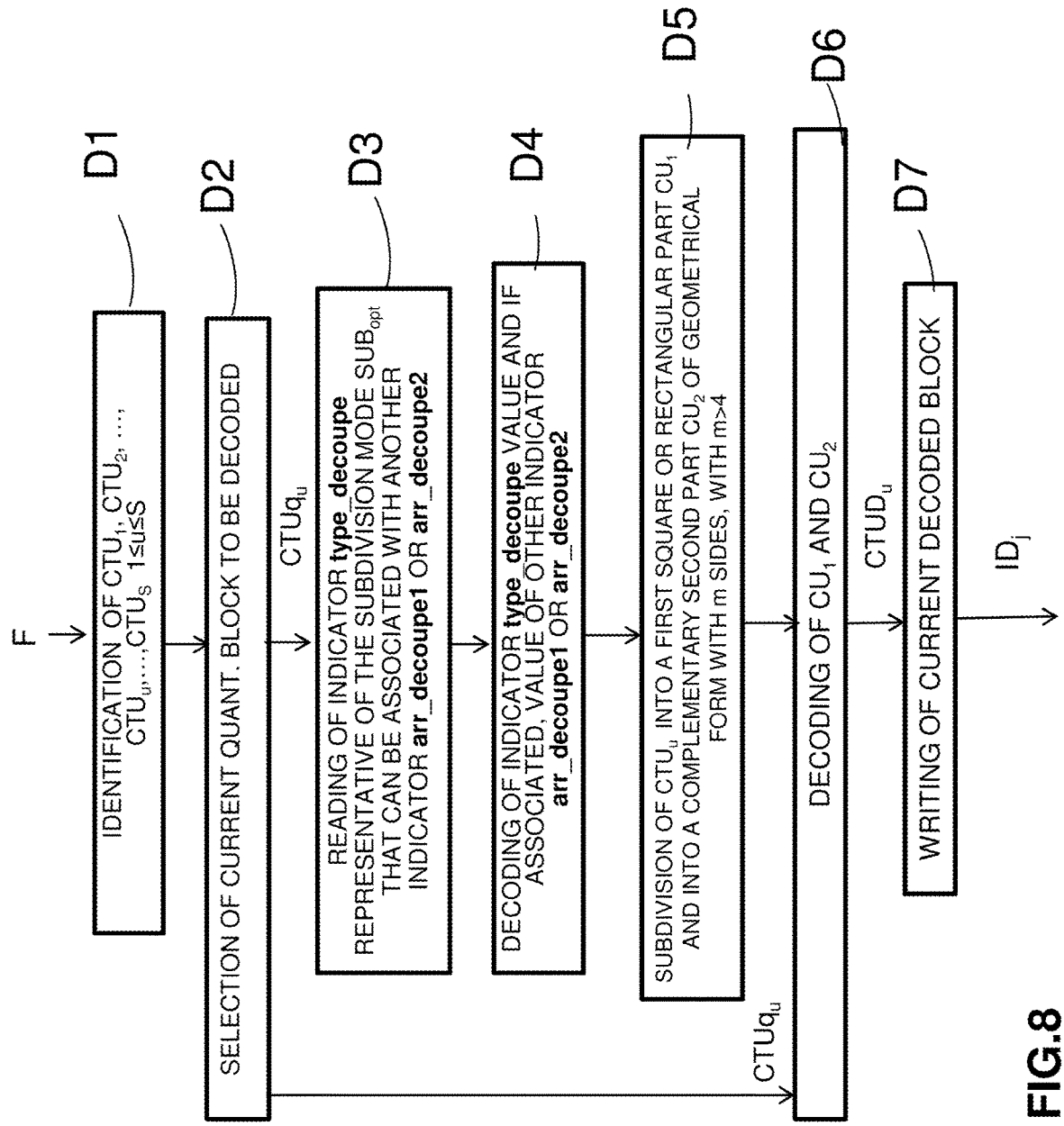
FIG. 8 represents the main steps of the decoding method according to an embodiment of the invention.

The decoding method represented in FIG. 8 is applied to a data signal representative of a fixed current image $IC_j$ to be decoded or of a sequence of images to be decoded.

To this end, information representative of the current image $IC_j$ to be decoded is identified in the data signal F received on the decoder DO, as delivered following the coding method of FIG. 3.

Referring to FIG. 8, during a step D1, there are identified in the signal F, quantized blocks $CTUq_1, CTUq_2, \ldots,$ $CTUq_u, \ldots, CTUq_S$ ($1 \leq u \leq S$) associated respectively with the blocks $CTU_1, CTU_2, \ldots, CTU_u, \ldots, CTU_S$ coded previously according to the abovementioned lexicographic order, according to the coding method of FIG. 3.

Such an identification step is implemented by a flow analysis identification processor or software module MI_DO, as represented in FIG. 9, said module being driven by the microprocessor μP of the processing unit UT_DO.

Other types of scanning than that which has just been described above are of course possible and depend on the scan order chosen in decoding.

Preferentially, each of the blocks to be decoded $CTU_1, CTU_2, \ldots, CTU_u, \ldots, CTU_S$ has a square form and comprises N×N pixels, where N≤2.

According to an alternative, each of the blocks to be decoded $CTU_1, CTU_2, \ldots, CTU_u, \ldots, CTU_S$ has a rectangular form and comprises N×P pixels, where N≥1 and P≥2.

During a step D2 represented in FIG. 8, the decoder DO of FIG. 9 selects as current block the first quantized block $CTUq_u$ which contains quantized data which have been coded during the step C6 of FIG. 3.

During a step D3 represented in FIG. 8, together with the quantized block $CTUq_u$ which has been selected, the compressed value of the syntax element type_decoupe which was selected on completion of the step C4 of FIG. 3 is read, together, if necessary, with the compressed value of the syntax element arr_decoupe1 or arr_decoupe2 which is associated with it.

As explained above in the description, the syntax element type_decoupe designates the indicator representative of a given subdivision mode. According to a preferential embodiment, the syntax element type_decoupe takes for example three values:
 0 to indicate a conventional subdivision of the current block into four rectangular or square blocks,
 1 to indicate a subdivision of the current block in accordance with the subdivision mode represented in FIG. 5A,
 2 to indicate a subdivision of the current block in accordance with the subdivision mode represented in FIG. 5B,
 3 to indicate an absence of subdivision of the current block.

The reading step D3 is performed by a reading processor or software module ML_DO, such as represented in FIG. 9, which module is driven by the microprocessor μP of the processing unit UT_DO.

In a way identical to the coder CO of FIG. 4, the buffer memory TAMP_DO of the coder DO of FIG. 9 has stored in it:
 a predefined list $LT_a$ of several sets of coordinates each defining a rectangular block of a predetermined form,
 a predefined list $LT_b$ of several sets of coordinates each defining a rectangular block of a predetermined form,
 a look-up table TC.

During a step D4 represented in FIG. 8, the value of the syntax element type_decoupe which was read in the abovementioned step D3 is decoded together, if necessary, with the decoding of the value of the syntax element arr_decoupe1 or arr_decoupe2 which is associated with it.

The abovementioned step D4 is implemented by an indicator decoding processor or software module MDI as represented in FIG. 9, which module is driven by the microprocessor μP of the processing unit UT_DO.

During a step D5 represented in FIG. 8, the current block CTU is subdivided into at least one first part $CU_1$ and one second part $CU_2$, the first and second parts complementing one another. According to the invention:
 the first part $CU_1$ has a rectangular or square form,
 and the second part $CU_2$ has a geometrical form with m sides, where m>4.

According to a preferred embodiment, the current block CTU is subdivided:
 into a first part $CU_1$ of rectangular or square form or else into a plurality of parts of rectangular or square form,
 and into at most one second part $CU_2$ of a geometrical form with m sides.

Examples of subdivision have been presented with reference to FIGS. 5A and 5B above and will not be described again here.

The subdivision step D5 is performed by a partitioning processor or software module MP_DO, as represented in FIG. 9, which module is driven by the microprocessor μP of the processing unit UT_DO.

During a step D6 represented in FIG. 8, the parts $CU_1$ and $CU_2$ of the current block $CTU_u$ to be decoded are decoded according to a predetermined scan order. According to a preferred embodiment, the first part $CU_1$ is decoded before the second part $CU_2$. Alternatively, the first part $CU_1$ is decoded after the second part $CU_2$.

The decoding step D6 is implemented by a decoding processor or software module UDO as represented in FIG. 9, which module is driven by the microprocessor μP of the processing unit UT_DO.

As represented in more detail in FIG. 9, the decoding module UDO conventionally comprises:
 an entropic decoding processor or software module MDE_DO, for example of CABAC ("context adaptive binary arithmetic coder") type, or even a Huffman decoder known as such,
 a dequantization processor or software module $MQ1^{-1}\_DO$,
 an inverse transformation processor or software module $MT1^{-1}\_DO$ of $DCT^{-1}$ (discrete cosine transform), $DST^{-1}$ (discrete sine transform), $DWT^{-1}$ (discrete wavelet transform) type,
 an inverse prediction processor or software module $PRED1^{-1}\_DO$,
 a block reconstruction computation processor or module CAL2_DO.

On completion of the step D6, a current decoded block $CTUD_u$ is obtained.

During a step D7 represented in FIG. 8, said decoded block $CTUD_u$ is written into a decoded image $ID_j$.

Such a step is implemented by an image reconstruction processor or software module URI as represented in FIG. 9, said module being driven by the microprocessor μP of the processing module UT_DO.

The decoding steps which have just been described above are implemented for all the blocks $CTU_1, CTU_2, \ldots, CTU_u, \ldots, CTU_S$ to be decoded of the current image $IC_j$ considered, in a predetermined order which is, for example, the lexicographic order.

Other run-through types than that which has just been described above are of course possible.

Figure 10A:
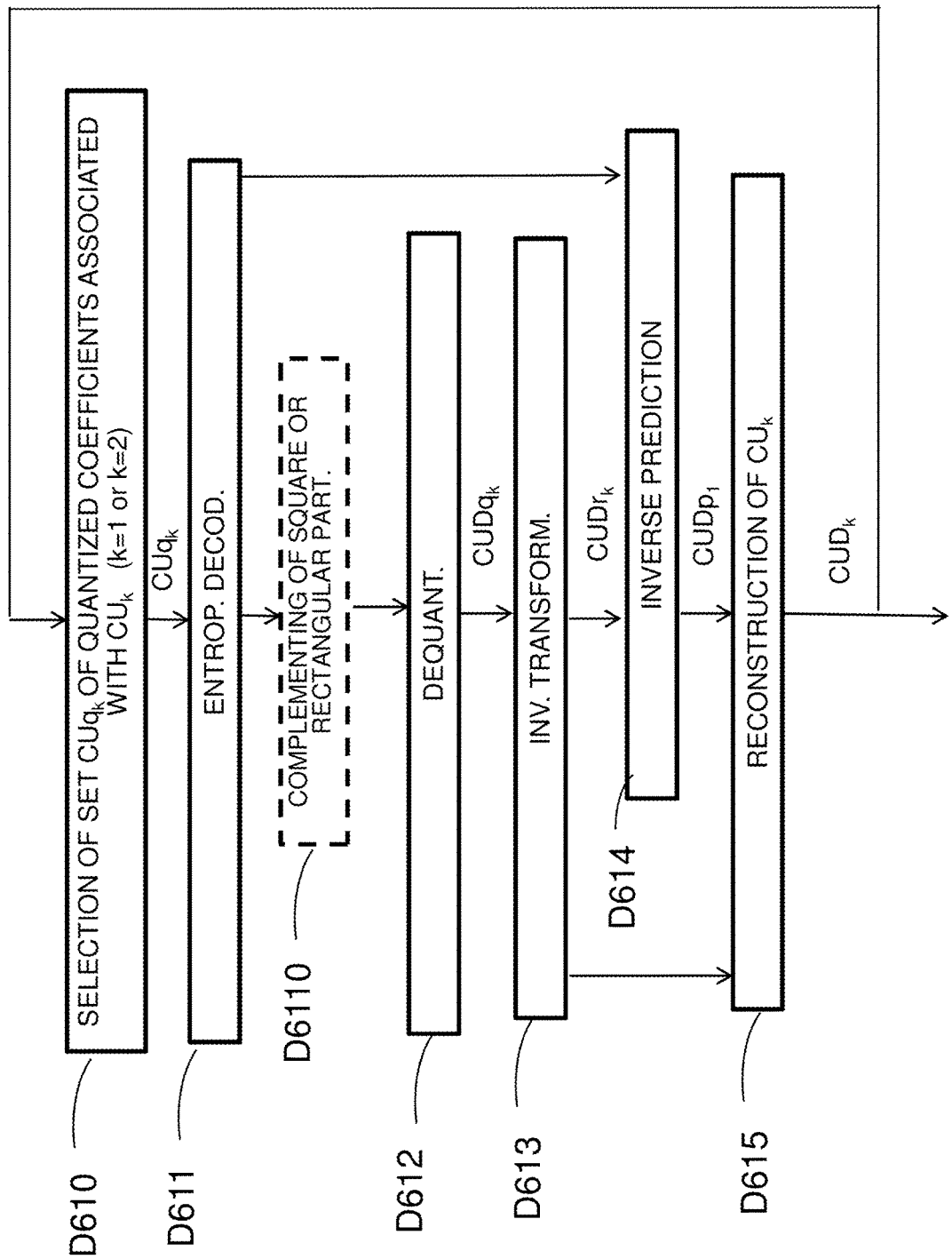

There now follows a description, with reference to FIG. 10A, of a first embodiment of the different substeps implemented during the abovementioned decoding step D6, in the decoding module UDO represented in FIG. 9.

According to this first embodiment, the data signal F contains the partitioning indicators of a current block $CTU_u$ which has been coded according to the embodiment of FIG. 6A. To this end, as described above in the description associated with the embodiment of FIG. 6A, the signal F contains the following four values 1133 which have been decoded on completion of the abovementioned step D4 and which are representative:
- of the partitioning of the current block $CTU_u$ according to one of the subdivision modes represented in FIG. 5A and more specifically according to the type of subdivision $SUBD2_1$ of FIG. 5A,
- and of the absence of subdivision of the parts $CU_1$ and $CU_2$ of the current block $CTU_u$.

As a variant, the data signal F contains the following three values 113, in the case where the indicator type_decoupe of value 3 associated with the coded data of the second part $CU_2$ has not been entered into the data signal F, given the fact that the second part $CU_2$ defines a uniform zone of the current block $CTU_u$.

Consequently, the indicator type_decoupe is systematically set to the predetermined value 3, such that the second part $CU_2$ is not subdivided in the decoding.

During a substep D610 represented in FIG. 10A, the decoding module UDO selects, as current set of quantized coefficients $CUq_k$ associated with the current part $CU_k$ (k=1 or k=2), either the set of quantized coefficients associated with the square part $CU_1$ first, or the set of quantized coefficients associated with the part $CU_2$ with m sides first.

During a substep D611 represented in FIG. 10A, there is an entropic decoding of the current set of quantized coefficients $CUq_1$ associated with the first part $CU_1$. In the preferred embodiment, the decoding performed is an entropic decoding of arithmetic or Huffman type. The substep D611 then consists in:
- reading the symbol or symbols of a predetermined set of symbols which are associated with the current set of quantized coefficients $Cuq_1$,
- associating numeric information, such as bits, with the symbol(s) read.

On completion of the abovementioned substep D611, a plurality of numeric information associated with the current set of quantized coefficients $Cuq_1$ is obtained.

Such an entropic decoding substep D611 is implemented by the entropic decoding module MDE_DO represented in FIG. 9.

During the abovementioned substep D611, there is also the decoding of the information relating to the predictive coding of the part $CU_1$ as implemented in the substep C611 of FIG. 6A, and which was entered into the data signal F. Such reconstruction information notably comprises the prediction type (inter- or intra-prediction), and if appropriate, the intra-prediction mode or else the reference image index and the motion vector used in the inter-prediction mode.

During a substep D612 represented in FIG. 10A, the numeric information obtained following the substep D611 is dequantized, according to a conventional dequantization operation which is the reverse operation of the quantization implemented during the quantization substep C614 of FIG. 6A. A current set of dequantized coefficients $CUDq_1$ is then obtained on completion of the substep D612. Such a substep D612 is performed by means of the dequantization module $MQ^{-1}\_DO$, as represented in FIG. 9.

During a substep D613 represented in FIG. 10A, the current set of dequantized coefficients $CUDq_1$ is transformed, such a transformation being a direct inverse transformation, such as, for example, an inverse discrete cosine transformation of $DCT^{-1}$ type. This transformation is the reverse operation of the transformation performed in the substep C613 of FIG. 6A. On completion of the substep D613, a decoded residual part $CUDr_1$ is obtained. Such an operation is performed by the module $MT^{-1}\_DO$ represented in FIG. 9.

During a substep D614 represented in FIG. 10A, the $PRED^{-1}\_DO$ module of FIG. 9 proceeds with the predictive decoding of the current part $CU_1$ using information relating to the predictive coding of the part $CU_1$ which was decoded during the abovementioned substep D611.

Said abovementioned substep of predictive decoding makes it possible to construct a predicted part $CUDp_1$ which is an approximation of the current part $CU_1$ to be decoded.

During a substep D615 represented in FIG. 10A, the CAL2_DO module of FIG. 9 proceeds with the reconstruction of the current part $CU_1$ by adding to the decoded residual part $CUDr_1$, obtained on completion of the substep D613, the predicted part $CUDp_1$ which was obtained on completion of the abovementioned substep D614.

The abovementioned substeps D610 to D615 are then iterated with a view to decoding the second part $CU_2$ with m sides of the current block $CTU_u$.

In accordance with the invention, in the case of the decoding of the second part $CU_2$ with m sides, one or more items of information on reconstruction of the pixels of the second part $CU_2$ are set to predetermined values.

Thus, preferentially, during the substep D614 of predictive decoding of the part $CU_2$ of the current block $CTU_u$, the pixels of the part $CU_2$ to be decoded are predicted relative respectively to pixels of predetermined corresponding values. Such values are stored in a list LP contained in the buffer memory TAMP_DO of the decoder DO of FIG. 9.

According to a preferred variant embodiment, the substep D610 of FIG. 10A is not implemented since no set of quantized coefficients associated with the part $CU_2$ with m sides has been transmitted in the data signal F. The quantized coefficients of the quantized residual part $CUq_2$ are then directly all set to zero by the decoding module UDO of FIG. 9.

Such an arrangement is made advantageous by the fact that the part $CU_2$ of the current block $CTU_u$ which has been coded is considered uniform.

According to another preferred variant embodiment, the abovementioned substep D611 is not completely implemented, the decoder DO directly deducing, following the abovementioned substep D610, predetermined values of reconstruction information associated with the residual part $CUr_2$.

Such an arrangement is made advantageous by the fact that the part $CU_2$ of the current block $CTU_u$ which has been coded is considered uniform.

As a variant, the pixels of the part $CU_2$ to be decoded are predicted conventionally, in the same way as the part $CU_1$.

In accordance with the invention, between the abovementioned substeps D611 and D612, an intermediate step D6110 is implemented. During this intermediate step, the decoded pixel values which have been obtained following the step of entropic decoding of the plurality of numeric information associated with the current set of quantized coefficients $CUq_2$ are complemented with predetermined pixel values, until a square or rectangular block of pixel values is obtained.

According to different possible embodiments, the pixel values associated with the current set of quantized coefficients $CUq_2$ can be complemented:
- with respective zero pixel values,
- with pixel values reconstructed conventionally by interpolation, with pixel values reconstructed conventionally using the so-called "inpaiting" technique.

The abovementioned substep D6110 is implemented by a computation software module CAL1_DO as represented in FIG. 9, which module is driven by the microprocessor µP of the processing unit UT_DO.

Such an arrangement makes it possible to re-use the transformation software module $MT^{-1}$_DO of FIG. 9 which conventionally applies square or rectangular block transforms.

Given the fact that the substep D6110 is applied only for the decoded pixel values which have been obtained following the step of entropic decoding of the plurality of numeric information associated with the current set of quantized coefficients $CUq_2$ of a geometrical form with m sides, this step, like the computation module CAL1_DO, are represented by dotted lines, respectively in FIGS. 10A and 9.

There now follows a description, referring to FIG. 10B, of a second embodiment of the different substeps implemented during the abovementioned decoding step D6, in the coding module UDO represented in FIG. 9.

This second embodiment is distinguished from that of FIG. 10A by the fact that the first part $CU_1$ to be decoded of the current block $CTU_u$ is subdivided again.

According to this second embodiment, the data signal F contains the partitioning indicators of a current block $CTU_u$ which has been coded according to the embodiment of FIG. 6B. To this end, as described above in the description associated with the embodiment of FIG. 6B, the signal F contains the following fifteen values 113032603333333 as represented in FIG. 7 and which have been decoded on completion of the abovementioned step D4.

Such values are representative:
of the partitioning of the current block $CTU_u$ according to one of the subdivision modes represented in FIG. 5A and more specifically according to the type of subdivision $SUBD2_1$ of FIG. 5A,
of the absence of subdivision of the second part $CU_2$ with m sides of the current block $CTU_u$,
of the subdivision of the first part $CU_1$ of the current block $CTU_u$ as represented in FIG. 7.

As a variant, the data signal F does not contain the two values equal to 3 represented in bold, in the case where:
the indicator type_decoupe of value 3 associated with the coded data of the second part $CU_2$ has not been entered into the data signal F, given the fact that the second part $CU_2$ defines a uniform zone of the current block $CTU_u$,
the indicator type_decoupe of value 3 associated with the coded data of the second part $CU22_1$ with m sides of the block $CU2_1$ as represented in FIG. 7, given the fact that the second part $CU22_1$ defines a uniform zone of the block $CU2_1$.

Consequently, the indicator type_decoupe is systematically set to the predetermined value 3, such that neither the second part $CU_2$ of the current block $CTU_u$ to be decoded, nor the second part $CU22_1$ with m sides of the block $CU2_1$ of the current block $CTU_u$ to be decoded, is subdivided in the decoding.

During a substep D620 represented in FIG. 10B, the decoding module UDO selects as current set of quantized coefficients $CUq_k$ associated with the current part $CU_k$ (k=1 or k=2), either the set of quantized coefficients associated with the square part $CU_1$ first, or the set of quantized coefficients associated with the part $CU_2$ with m sides first.

During a substep D621 represented in FIG. 10B, the decoding module UDO tests whether the index k associated with the current part $CU_k$ to be decoded has the value 1 or 2.

If the index k is equal to 2, the part $CU_2$ of the current block CTU to be decoded is decoded according to the substeps D610 to D615 of FIG. 10A.

If the index k is equal to 1, during a substep D622 represented in FIG. 10B, the decoding module UDO of FIG. 9 selects a current subpart $CU_{k'}$ to be decoded of the first part $CU_1$ of the current block $CTU_u$ to be decoded, such that $1 \geq k' \geq N$.

In the example represented in FIG. 7, N=8, since the first part $CU_1$ of the current block $CTU_u$ has been subdivided into eight subparts of "coding unit" type $CU1_1$, $CU21_1$, $CU2_1$, $CU31_1$, $CU32_1$, $CU33_1$, $CU34_1$, $CU4_1$.

During a substep D623 represented in FIG. 10B, the entropic decoding module MDE_DO of FIG. 9 proceeds with an entropic decoding of the current set of quantized coefficients $CUq_w$ associated with the current subpart $CU_{k'}$ of the first part $CU_1$ of the current block $CTU_u$ to be decoded. In the preferred embodiment, the decoding performed is an entropic decoding of arithmetic or Huffman type. The substep D623 then consists in:
reading the symbol or symbols of a predetermined set of symbols which are associated with the current set of quantized coefficients $CUq_w$,
associating numeric information, such as bits, with the symbol(s) read.

On completion of the abovementioned substep D623, a plurality of numeric items of information associated with the current set of quantized coefficients $CUq_{k'}$ is obtained.

During the substep D623, the entropic decoding module MDE_DO of FIG. 9 proceeds also with an entropic decoding of the indicator IPR representative of the inter- or intra-prediction mode which has been selected for this current subpart $CU_{k'}$ during the substep C623 of FIG. 6B.

During an optional substep D624 represented in FIG. 10B, in the case where the current subpart $CU_{k'}$ to be decoded has been subdivided during the substep C626 of FIG. 6B into a plurality W of prediction subparts $PU_1$, $PU_2$, . . . , $PU_z$, . . . $PU_W$ (1≤z≤W), the reading software module ML_DO of FIG. 9 proceeds to read the compressed value of the indicator representative of such a subdivision. Such an indicator consists of the syntax element type_decoupe and, if appropriate, of the syntax element arr_decoupe1 or arr_decoupe2 which is associated with it.

During an optional substep D625 represented in FIG. 10B, the indicator decoding software module MDI of FIG. 9 proceeds with the decoding of the value of the syntax element type_decoupe which was read in the abovementioned substep D624 and, if appropriate, with the decoding of the value of the syntax element arr_decoupe1 or arr_decoupe2 which is associated with it.

During an optional substep D626 represented in FIG. 10B, the partitioning software module MP_DO of FIG. 9 subdivides the current subpart $CU_{k'}$ to be decoded into a plurality W of prediction subparts $PU_1$, $PU_2$, . . . , $PU_z$, . . . , $PU_W$ (1≤z≤W).

During an optional substep D627 represented in FIG. 10B, the decoding module UDO of FIG. 9 selects a first current subpart $PU_z$. Such a selection is performed in a predefined order, such as, for example, the lexicographic order.

During an optional substep D628 represented in FIG. 6B, the entropic decoding module MDE_DO of FIG. 9 proceeds, in association with the current subpart $PU_z$, with an entropic decoding of the optimal prediction parameters which were selected during the substep C626 of FIG. 6B, in association with the indicator $I_{PR}$ which is representative of the prediction mode selected in the abovementioned substep C623 and which was decoded in the substep D623. If, for example, the INTER-prediction mode was selected in the abovementioned substep C623, the decoded optimal prediction parameters are one or more motion vectors, and one or more reference images. If, for example, the INTRA-prediction mode was selected in the abovementioned substep C623, the optimal prediction parameters are associated with an INTRA mode selected from different available INTRA modes.

The substeps D627 to D628 are iterated for each of the subparts $PU_1, PU_2, \ldots, PU_z, \ldots, PU_W$ of the current subpart $CU_{k'}$ to be decoded of the first part $CU_1$ of the current block $CTU_u$, in the predetermined lexicographic order.

During an optional substep D629 represented in FIG. 10B, in the case where the current subpart $CU_{k'}$ to be decoded has been subdivided, during the substep C627 of FIG. 6B, into a plurality Z of transform subparts $TU_1$, $TU_2, \ldots, TU_w, \ldots TU_Z$ ($1 \leq w \leq Z$), the reading software module ML_DO of FIG. 9 proceeds to read the compressed value of the indicator representative of such a subdivision. Such an indicator consists of the syntax element type_decoupe and, if appropriate, of the syntax element arr_decoupe1 or arr_decoupe2 which is associated with it.

During an optional substep D630 represented in FIG. 10B, the indicator decoding software module MDI of FIG. 9 proceeds with the decoding of the value of the syntax element type_decoupe which was read in the abovementioned substep D629 and, if appropriate, with the decoding of the value of the syntax element arr_decoupe1 or arr_decoupe2 which is associated with it.

During an optional substep D631 represented in FIG. 10B, the partitioning software module MP_DO of FIG. 9 subdivides the current subpart $CU_{k'}$ to be decoded into a plurality Z of transform subparts $TU_1$, $TU_2$, ..., $TU_w$, ..., $TU_Z$ ($1 \leq w \leq Z$).

During an optional substep D632 represented in FIG. 6B, the decoding module UDO of FIG. 9 selects the current set of quantized coefficients $TUq_w$ associated with the first current transform subpart $TU_w$. Such a selection is performed in a predefined order, such as, for example, the lexicographic order.

During a substep D633 represented in FIG. 6B, the entropic decoding module MDE_DO of FIG. 9 proceeds with an entropic decoding of the current set of quantized coefficients $TUq_w$ associated with the first current transform subpart $TU_w$ to be decoded. In the preferred embodiment, the decoding performed is an entropic decoding of arithmetic or Huffman type. The substep D633 then consists in:
reading the symbol or symbols of a predetermined set of symbols which are associated with the current set of quantized coefficients $Cuq_1$,
associating numeric information, such as bits, with the symbol(s) read.

On completion of the abovementioned substep D633, a plurality of numeric items of information associated with the current set of quantized coefficients $TUq_w$ is obtained.

During a substep D634 represented in FIG. 10B, the dequantization module $MQ^{-1}\_DO$ of FIG. 9 proceeds with the dequantization of the numeric information obtained following the substep D633, according to a conventional dequantization operation which is the reverse operation of the quantization implemented during the quantization substep C631 of FIG. 6B. A current set of dequantized coefficients $TUDq_w$ is then obtained on completion of the substep D634.

During a substep D635 represented in FIG. 10B, the module $MT^{-1}\_DO$ of FIG. 9 proceeds with a transformation of the current set of dequantized coefficients $TUDq_w$, such a transformation being an inverse direct transformation, such as, for example, an inverse discrete cosine transformation of $DCT^{-1}$ type. This transformation is the reverse operation of the transformation performed in the substep C630 of FIG. 6A. On completion of the substep D635, a decoded residual part $TUDr_w$ is obtained.

During a substep D636 represented in FIG. 10B, the $PRED^{-1}\_DO$ module of FIG. 9 proceeds with the predictive decoding of the first current transform subpart $TU_w$ using optimal prediction parameters which were read during the abovementioned substep D628.

Said abovementioned predictive decoding substep makes it possible to construct a first current predicted transform subpart $TUDp_w$ which is an approximation of the first current transform subpart $TU_w$ to be decoded.

During a substep D637 represented in FIG. 10B, the CAL2_DO module of FIG. 9 proceeds with the reconstruction of the first current transform subpart $TU_w$ by adding to the decoded residual part $TUDr_w$ obtained on completion of the substep D635, the predicted part $TUDp_w$ which was obtained on completion of the abovementioned substep D636.

The set of substeps D632 to D637 is iterated for each of the subparts TU1, TU2, ..., $TU_w$, ..., $TU_Z$ to be decoded of the current subpart $CU_{k'}$ to be decoded of the first part $CU_1$ of the current block $CTU_u$, in the predetermined lexicographic order.

According to the invention, in the case where the current transform subpart $TU_w$ has a geometrical form with m sides, an intermediate substep D6330 is implemented between the abovementioned substeps D633 and D634. During this intermediate substep, the decoded pixel values which were obtained following the substep D633 of entropic decoding of the plurality of numeric items of information associated with the current set of quantized coefficients $TUq_w$ are complemented with predetermined pixel values, until a square or rectangular block of pixel values is obtained.

The abovementioned substep D6330 is implemented by the computation software module CAL1_DO as represented in FIG. 9.

The set of the substeps D622 to D637 is iterated for each of the subparts $CU_1, CU_2, \ldots, CU_{k'}, \ldots, CU_N$ to be decoded of the first current part $CU_1$ of the current block $CTU_u$, in the predetermined lexicographic order.

An exemplary embodiment of the invention remedies drawbacks of the abovementioned prior art.

It goes without saying that the embodiments which have been described above have been given in a purely indicative and nonlimiting manner, and that numerous modifications can easily be made by a person skilled in the art without in any way departing from the scope of the invention.

What is claimed is:
1. A decoding method comprising:
decoding a data signal representative of at least one coded image having been subdivided into a plurality of blocks of pixels, wherein decoding comprises the following acts performed by a decoding device, for at least one current block of pixels to be decoded:
reading, in said data signal, a syntax element indicating a subdivision mode of said at least one current block;

decoding a value of said syntax element representative of a subdivision of said at least one current block into a first part and a second part, the first part having a rectangular or square form and the second part forming the complement of the first part in the current block, said second part having a geometrical form with m sides, where m>4;

subdividing said at least one current block according said decoded value of said syntax element representative of the subdivision of said at least one current block into the first part and the second part, decoding the first and second parts of the current block according to a predetermined scan order, said decoding comprising:

for said first part of the current block:
selecting, in said data signal, quantized coefficients associated to said first part of the current block;
decoding said selected quantized coefficients, a decoded residual part associated to said first part being obtained;
decoding information relating to a predictive coding of said first part, a predicted part being obtained;
reconstructing said first part from said decoded residual part and said predicted part, for said second part of the current block:
when no quantized coefficient associated to said second part is in the data signal:
deducing, directly from said decoded value of said syntax element representative of the subdivision of said at least one current block into the first part and the second part, at least one item of information of reconstruction of said second part with m sides of the current block, said at least one item of information of reconstruction being set to a predetermined zero value of said quantized coefficients of a quantized residual part associated to said second part with m sides; and
reconstructing said second part with m sides according to said predetermined zero value.

2. The decoding method as claimed in claim 1, in which, at least one item of information of reconstruction of said second part with m sides corresponds to some values of prediction pixels which are stored in the decoding device.

3. The decoding method as claimed in claim 1, in which said at least one item of information of reconstruction of the second part with m sides of the current block is representative of an act of not subdividing said second part with m sides of the current block.

4. The decoding method as claimed in claim 1, in which said act of reading comprises reading, in the data signal, an item of information indicating whether the current block is intended to be subdivided into said first and second parts or else according to another predetermined method.

5. The decoding method as claimed in claim 1, in which said act of reading comprises reading, in the data signal, an item of information indicating a given subdivision configuration of the current block into said first and second parts, said configuration being selected from various predetermined subdivision configurations.

6. The decoding method as claimed in claim 1, in which the act of decoding of coded data of the second part with m sides of the current block comprises in the following sub-acts:

applying an entropic decoding to the pixels of said second part with m sides; and complementing the entropically decoded pixels of said second part with m sides with pixels reconstructed according to a predetermined reconstruction method, until a square or rectangular block of pixels is obtained.

7. The decoding method as claimed in claim 1, in which a subdivided current block contains at most a part having a geometrical form with m sides.

8. A decoding device comprising:
a non-transitory computer-readable medium comprising instructions stored thereon; and
a processor configured by the instructions to decode a data signal representative of at least one coded image having been subdivided into a plurality of blocks, wherein decoding comprises, for at least one current block to be decoded:

reading, in said data signal, a syntax element indicating a subdivision mode of said at least one current block of pixels;

decoding a value of said syntax element representative of a subdivision of said at least one current block of pixels into a first part and a second part, the first part having a rectangular or square form and the second part forming the complement of the first part in the current block, said second part having a geometrical form with m sides, where m>4;

subdividing said at least one current block according said decoded value of said syntax element representative of the subdivision of said at least one current block into the first part and the second part, decoding the first and second parts of the current block according to a predetermined scan order, said decoding comprising:

for said first part of the current block:
selecting, in said data signal, quantized coefficients associated to of said first part of the current block;
decoding said selected quantized coefficients, a decoded residual part associated to said first part being obtained;
decoding information relating to a predictive coding of said first part, a predicted part being obtained,
reconstructing said first part from said decoded residual part and said predicted part, for said second part of the current block:
when no quantized coefficient associated to said second part of the current block is in the data signal:
deducing, directly from said decoded value of said syntax element representative of the subdivision of said at least one current block into the first part and the second part at least one item of information of reconstruction of said second part with m sides of the current block, said at least one item of information of reconstruction being set to a predetermined zero value of said quantized coefficients of a quantized residual part associated to said second part with m sides; and
reconstructing said second part with m sides according to said predetermined zero value.

9. A non-transitory computer-readable medium comprising a computer program stored thereon and comprising instructions for decoding a data signal representative of at least one coded image having been subdivided into a plurality of blocks, when the instructions are run on a computer of a decoding device, wherein the instructions configure the decoding device to perform, for at least one current block to be decoded, the acts comprising:

reading, in said data signal, a syntax element indicating a subdivision mode of said at least one current block of pixels;

decoding a value of said syntax element representative of a subdivision of said at least one current block of pixels into a first part and a second part, the first part having a rectangular or square form and the second part forming the complement of the first part in the current block, said second part having a geometrical form with m sides, where m>4;

subdividing said at least one current block according said decoded value of said syntax element representative of the subdivision of said at least one current block into the first part and the second part, decoding the first and second parts of the current block according to a predetermined scan order, said decoding comprising:

for said first part of the current block:
selecting, in said data signal, quantized coefficients associated to of said first part of the current block;
decoding said selected quantized coefficients, a decoded residual part associated to said first part being obtained;
decoding information relating to a predictive coding of said first part, a predicted part being obtained,
reconstructing said first part from said decoded residual part and said predicted part, for said second part of the current block:
when no quantized coefficient associated to said second part of the current block is in the data signal:
deducing, directly from said decoded value of said syntax element representative of the subdivision of said at least one current block into the first part and the second part, at least one item of information of reconstruction of said second part with m sides, said at least one item of information of reconstruction being set to a predetermined zero value of said quantized coefficients of a quantized residual part associated to said second part with m sides of the current block; and
reconstructing said second part with m sides according to said predetermined zero value.

* * * * *